July 22, 1947.  C. T. GALLOWAY  2,424,271
GEAR GRINDING MACHINE
Filed April 24, 1945   17 Sheets-Sheet 1

Inventor
CLARENCE T. GALLOWAY
Attorney

July 22, 1947. C. T. GALLOWAY 2,424,271
GEAR GRINDING MACHINE
Filed April 24, 1945 17 Sheets-Sheet 3

Inventor
CLARENCE T. GALLOWAY
Attorney

Inventor
CLARENCE T. GALLOWAY
By
[signature], Attorney

July 22, 1947.  C. T. GALLOWAY  2,424,271
GEAR GRINDING MACHINE
Filed April 24, 1945   17 Sheets-Sheet 5

Inventor
CLARENCE T. GALLOWAY
By
Schlesinger
Attorney

July 22, 1947. C. T. GALLOWAY 2,424,271
GEAR GRINDING MACHINE
Filed April 24, 1945 17 Sheets-Sheet 6

Inventor
CLARENCE T. GALLOWAY
*[signature]* Attorney

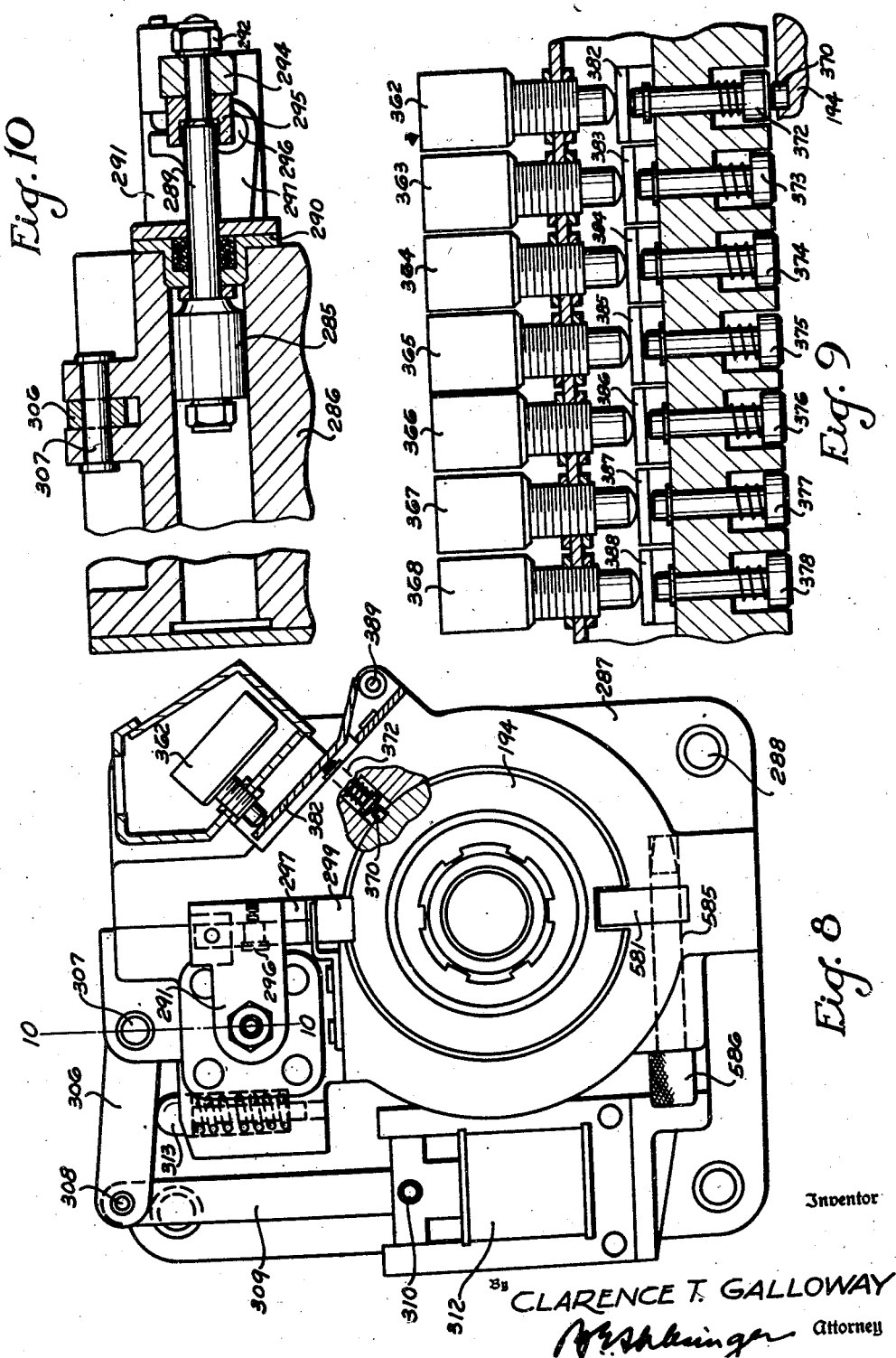

July 22, 1947.　　　　C. T. GALLOWAY　　　　2,424,271
GEAR GRINDING MACHINE
Filed April 24, 1945　　　17 Sheets-Sheet 8

Inventor
CLARENCE T. GALLOWAY
Attorney

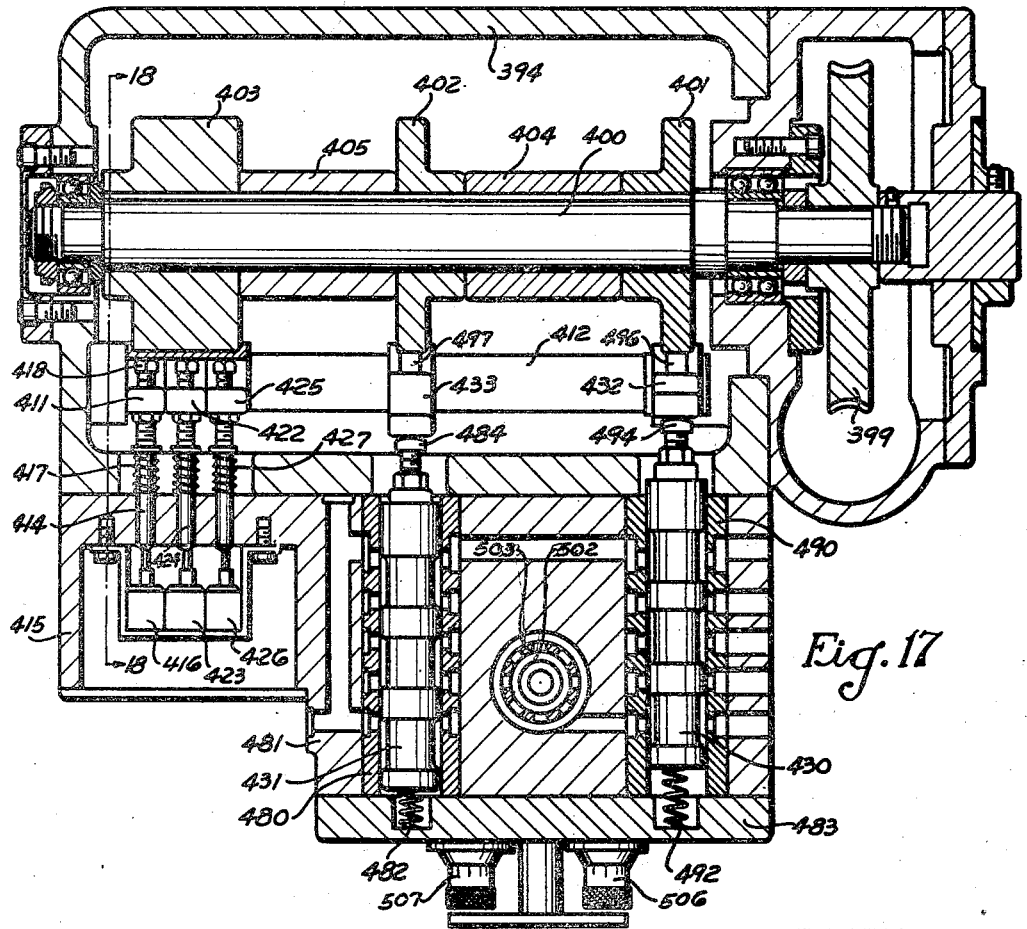

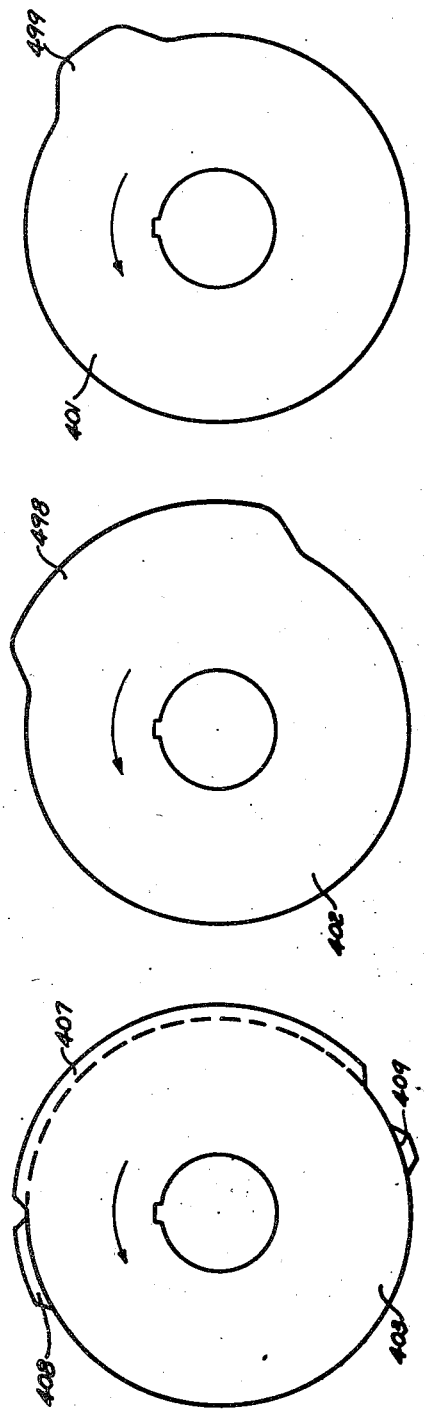

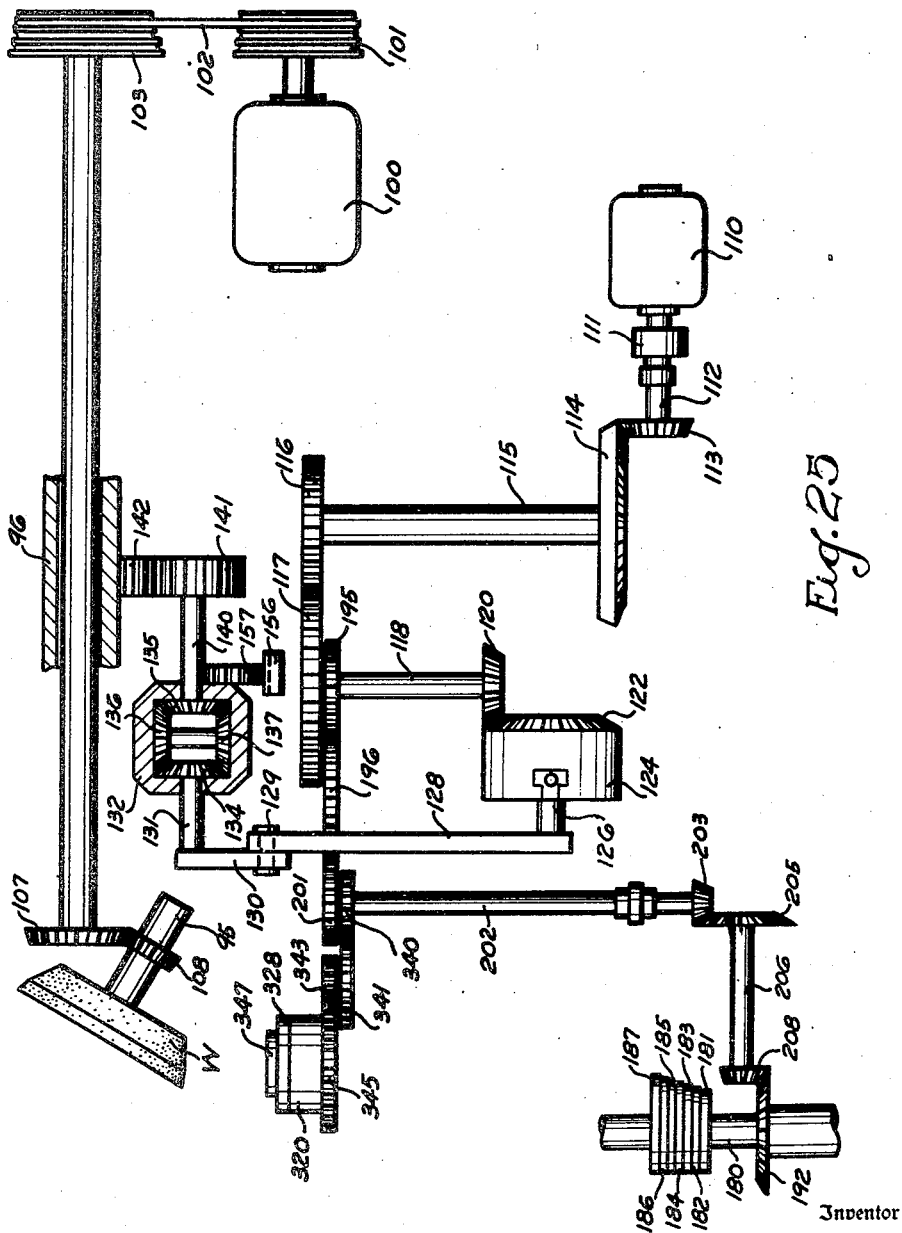

Inventor
CLARENCE T. GALLOWAY
Attorney

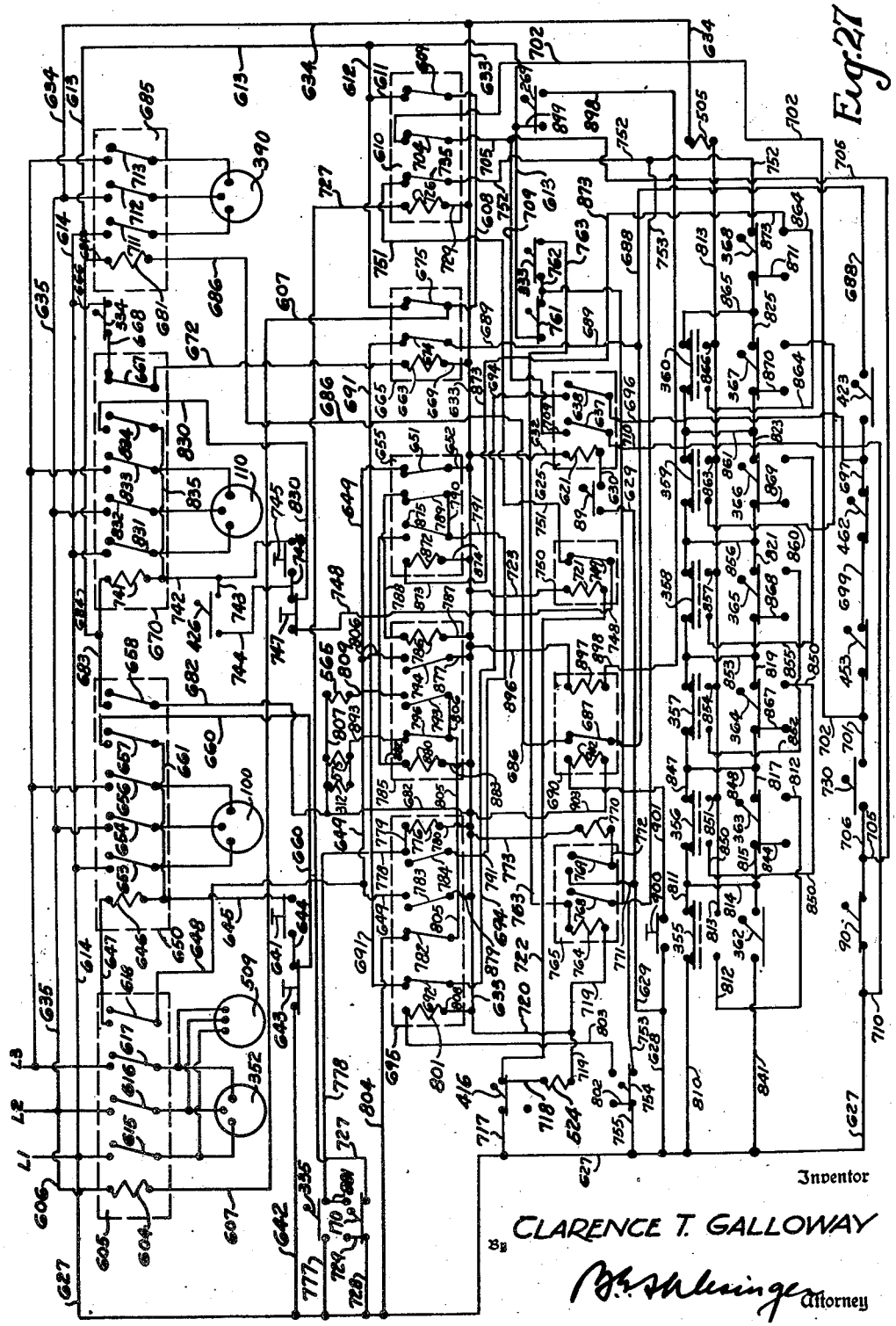

Patented July 22, 1947

2,424,271

UNITED STATES PATENT OFFICE 2,424,271

GEAR GRINDING MACHINE

Clarence T. Galloway, Pittsford, N. Y., assignor to Gleason Works, Rochester, N. Y., a corporation of New York Application April 24, 1945, Serial No. 590,028

20 Claims. (Cl. 51—33)

The present invention relates to machines for grinding gears and particularly to machines for grinding longitudinally curved toothed gears, such a spiral bevel and hypoid gears, in a forming operation. In a more particular aspect, the invention relates to machines for grinding longitudinally curved toothed gears in which the tool employed is a rotary cup-shaped grinding wheel and in which grinding is effected by swinging the rotating wheel to and fro across the face of the gear while the gear is held stationary on its axis.

Heretofore spiral bevel and hypoid gear grinding machines of the type referred to have been constructed to grind gears only of right-hand spiral tooth curvature, and no such machines have been available to grind left-hand spiral bevel or hypoid gears.

Moreover, such machines of this type, as have heretofore been built, have been constructed either for manually controlled operation, or, if automatic, have been limited to use for grinding gears which have previously been cut very close to finished size and shape. To grind a gear from the solid, the manually controlled machine had to be used, and the operator has had to restart the machine after each grinding cycle to put it through as many grinding cycles as were required to remove the stock from the blank and grind the tooth spaces of the gear to the desired depth. Before each grinding cycle, moreover, the operator had to advance the wheel manually relative to the work so that on the succeeding grinding operation, the wheel might grind deeper into the work, and furthermore, at the required stages in the grinding operation, the operator had to actuate the mechanism for dressing the grinding wheel.

Dressing is always necessary between rough-grinding and finish-grinding and, where there are many rough-grinding operations to be performed, as is the case where a gear of any but the finest pitch is being ground from the solid, it is the practice to dress the wheel one or more times, also, between rough-grinding operations. This prevents the wheel from loading up and keeps it coarse enough to rough-grind the tooth sides fast and without burning.

With conventional machines, then, when grinding gears from the solid, the operator has to be practically in constant attendance. Moreover, with conventional machines special training and judgment are required on the part of the operator to be sure that the wheel is dressed at the proper times. In these days of manpower shortage and lack of skilled help, the necessary training and judgment are not always available.

One object of the present invention is to provide a machine on which longitudinally curved toothed gears of left-hand as well as of right-hand spiral tooth curvature may be ground in a forming operation.

Another object of the invention is to provide a gear grinding machine of the type described on which gears may be finish-ground automatically direct from the solid.

Another object of the invention is to provide a gear grinding machine in which the number of operations that may be performed on the work prior to finish-grinding may be adjusted, so that the machine may be used to grind automatically different gears from the solid or also gears whose teeth have previously been cut close to finished size and shape.

A further object of the invention is to provide a fully automatic gear grinding machine of the type described in which the grinding wheel is fed progressively into the work for successive grinding operations, in which the wheel is dressed automatically when required and is advanced into the work automatically to compensate for wear, etc., and in which each operation is performed in its proper sequence from the time that the work is placed on the machine until it is finish-ground.

Still another object of the invention is to provide a fully automatic gear grinding machine in which adjustable controls are provided to govern the number of grinding operations on the work, the amount of stock which is to be ground off the work in each grinding operation, the frequency and occurrence of the dressing operations on the wheel, the amount of stock to be removed from the wheel in each dressing operation, etc.

Other objects of the invention will be apparent hereinafter from the specification and from the recital of the appended claims.

In general, the machine of the present invention is an improvement on machines of the type disclosed in the U. S. patent to Bullock et al. No. 2,099,674 and in my prior Patent No. 2,133,386, of October 18, 1938, and many parts of the machine illustrated in the accompanying drawings are of the same general construction as parts of the machines of these patents.

In the machine of the drawings, the grinding wheel rotates continuously on its axis as long as the machine is in operation. In each grinding operation on a tooth space of the work, the rotating wheel is swung back and forth along the length of the tooth space and fed into the work. Then the wheel is withdrawn from engagement with the work, and the work is indexed. If only a finish-grinding operation is required, the gear is completed when the work has been indexed through one revolution. If both rough-grinding and finish-grinding operations are to be performed on the work, grinding is effected in successive stages, all of the tooth spaces of the work being first rough-ground to a given depth, then all being further rough-ground to a greater depth, etc., until the desired depth has been attained, and then all being finish-ground.

The depth to which the wheel is fed into the work, during each grinding cycle is controlled by a feed cam which also effects withdrawal of the wheel from the work for indexing of the work. There are a series of these feed cams, all mounted on the same shaft, all of them being roughing feed cams except the last which is a finishing feed cam. The cams are of progressively different size and so constructed that each succeeding cam will, when in operative position, feed the wheel into the work a slightly greater distance than the preceding cam. Each, of course, permits withdrawal of the wheel at the end of the feed movement to permit indexing the work.

The feed cam shaft is adapted to be rotated in time with the cam which actually effects the indexing operation, the feed cam shaft being revolved once per feed cycle, namely, once during feed of the wheel into the work, withdrawal of the wheel from the work, and indexing of the work. The feed cam shaft is mounted to be movable axially, and after a grinding operation has been performed on all the tooth spaces of the work, the feed cam shaft is shifted axially to bring a new feed cam into operative position. Then the machine goes through another grinding cycle with the wheel regrinding all of the tooth spaces of the work, and the work being indexed after each tooth space has been reground. So the operation proceeds with all of the tooth spaces being ground to a given depth, and then the feed cam shaft being shifted, and all of the tooth spaces reground to a greater depth, until the work has been ground to the desired depth. Then the machine stops.

The initial axial position of the feed cam shaft depends, therefore, on the number of grinding operations to be performed on a given workpiece. Thus, if there are three rough-grinding operations and a finish-grinding operation to be performed on the work, the shaft is adjusted initially so that the fourth from the last feed cam is in position to be operative when the machine is in position to be operative when the machine starts, whereas if the five rough-grinding operations and the finish-grinding operation are to be performed on the work, the shaft is adjusted initially so that the sixth from last cam is in position to be operative when the machine starts. In the machine shown there are six roughing feed cams and a finishing feed cam, but it will be obvious that a greater number of cams can be used if required.

A series of adjustable selector switches are provided to control the dressing of the wheel. The positions of the different selector switches determine what takes place between the different grinding cycles. Each selector switch may be adjusted initially to one of three different positions, namely, "grind," "rough-dress," or "finish-dress." When a selector switch is at "grind" position, the only operation that occurs in the interval between the grinding cycles governed by that selector switch is axial shift of the feed cam shaft, and after this shift, the wheel is fed back into engagement with the work for the next grinding cycle. If the selector button is in either of the "dress" positions, however, the rotation of the feed cam shaft and the normal swinging movement of the wheel are stopped when the last tooth space of the gear has been ground in the immediately preceding grinding cycle; the wheel is swung up to dressing position; the dressing mechanism is swung into engagement with the wheel; the motor, which actuates the dressing mechanism, is started; and the wheel is rough-dressed or finish-dressed, as the case may be. When the dressing operation is completed, the wheel is swung back to operating position; the dressing mechanism is swung to inoperative position; the normal swinging movement of the wheel and the rotation of the feed cam and index cam shafts are restarted; and the dresser actuating motor is stopped.

The electrical circuit of the machine is so arranged that when the automatic stop mechanism of the machine trips after the finish-grinding operation, both the wheel and feed motors are stopped, and the feed cam shaft is shifted axially back to initial position, ready to grind a new gear.

In the drawings:

Fig. 1 is a side elevation of a spiral bevel and hypoid gear grinding machine built according to one embodiment of this invention, the work support being shown swung to inoperative position with the axis of the work spindle parallel to the axis of swing of the grinding wheel, and one corner of the base of the machine being broken away so as not to interfere with the signature to the sheet of drawings;

Fig. 8 is a view looking at the right hand end of Fig. 7, parts being broken away to show the mechanism for tripping the selector switches;

Fig. 9 is an enlarged developed sectional view, showing the selector switches and further illustrating the mechanism for operating the same;

Fig. 10 is a section approximately on the line 10—10 of Fig. 8;

Fig. 17 is a horizontal sectional view through the control mechanism;

Fig. 18 is a sectional view taken at right angles to the view of Fig. 17 and approximately on the line 18—18 of Fig. 17;

Fig. 19 is a vertical sectional view through the selector valve and the solenoid which operates the same;

Figure 26:
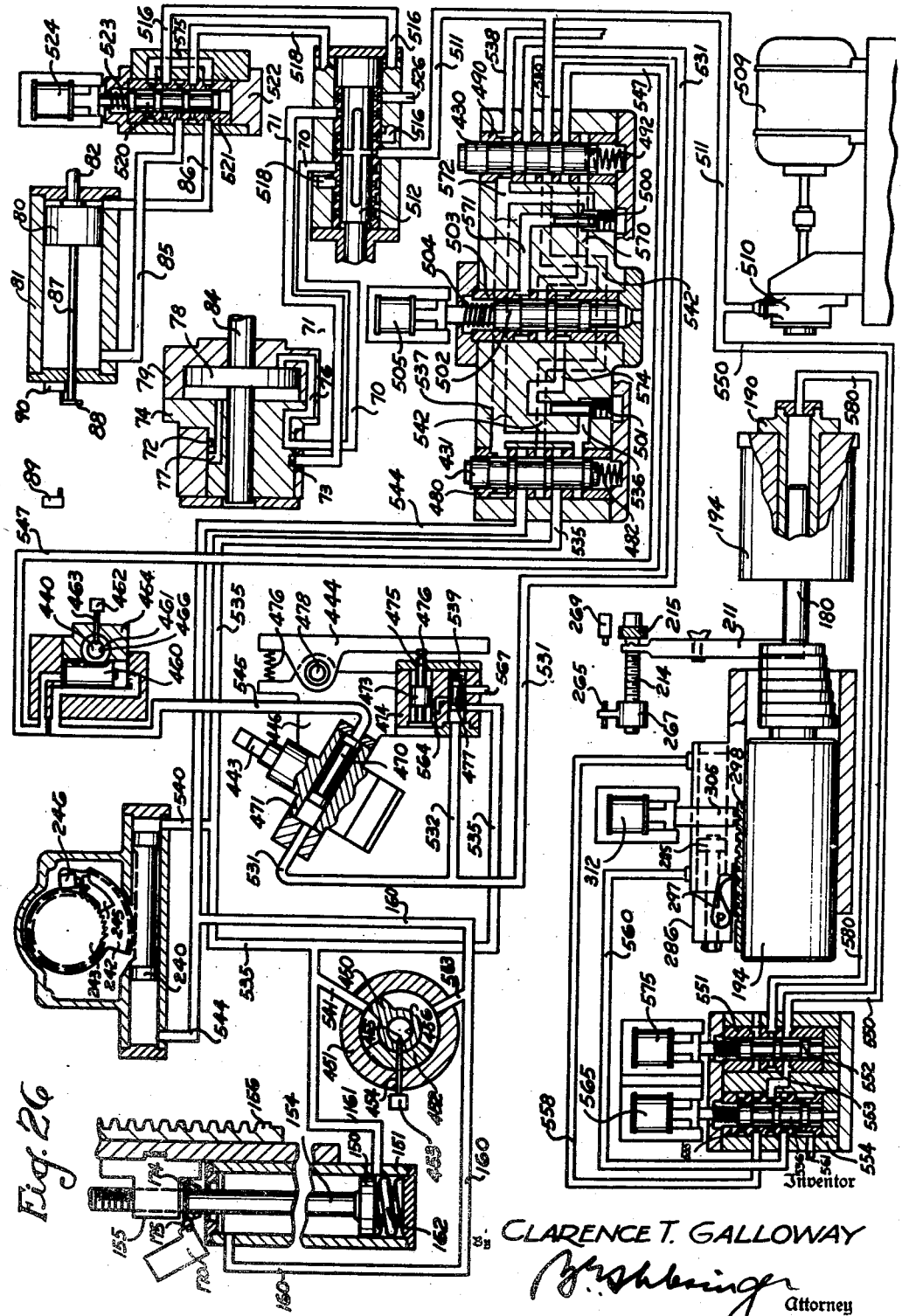

Figs. 20, 21, and 22 are detail views of the cams which control the dressing cycle;

Figs. 23 and 24 are detail views of other cams employed in the machine;

Fig. 25 is a diagrammatic view showing the gear drive of the machine;

Fig. 26 is a diagrammatic view showing the hydraulic circuit of the machine; and Fig. 27 is a diagrammatic view showing the electrical circuit of the machine.

Referring now to the drawings by numerals of reference, 30 denotes the base or frame of the machine. Mounted on this base or frame at one end thereof is a column or upright 31, and mounted to slide on parallel ways 32, 33, and 34 formed on the upper face of this base or frame at the opposite end thereof is a sliding base 35.

The grinding wheel W is mounted on the column 31 and within this column is housed part of the operating mechanism for the wheel. Mounted on the sliding base 35 for rectilinear adjustment thereon in a direction at right angles to the direction of movement of the sliding base is a slide 36. This slide may be adjusted on the sliding base by rotation of the shaft 52 which is journaled in the slide 36 and which carries a pinion 53 that meshes with a rack 54 that is secured to the sliding base. The slide 36 may be secured in any adjusted position on the sliding base by T-bolts 37 which pass through the slide and whose heads engage in elongated T-slots 38 formed in the upper face of the sliding base.

Figure 1:
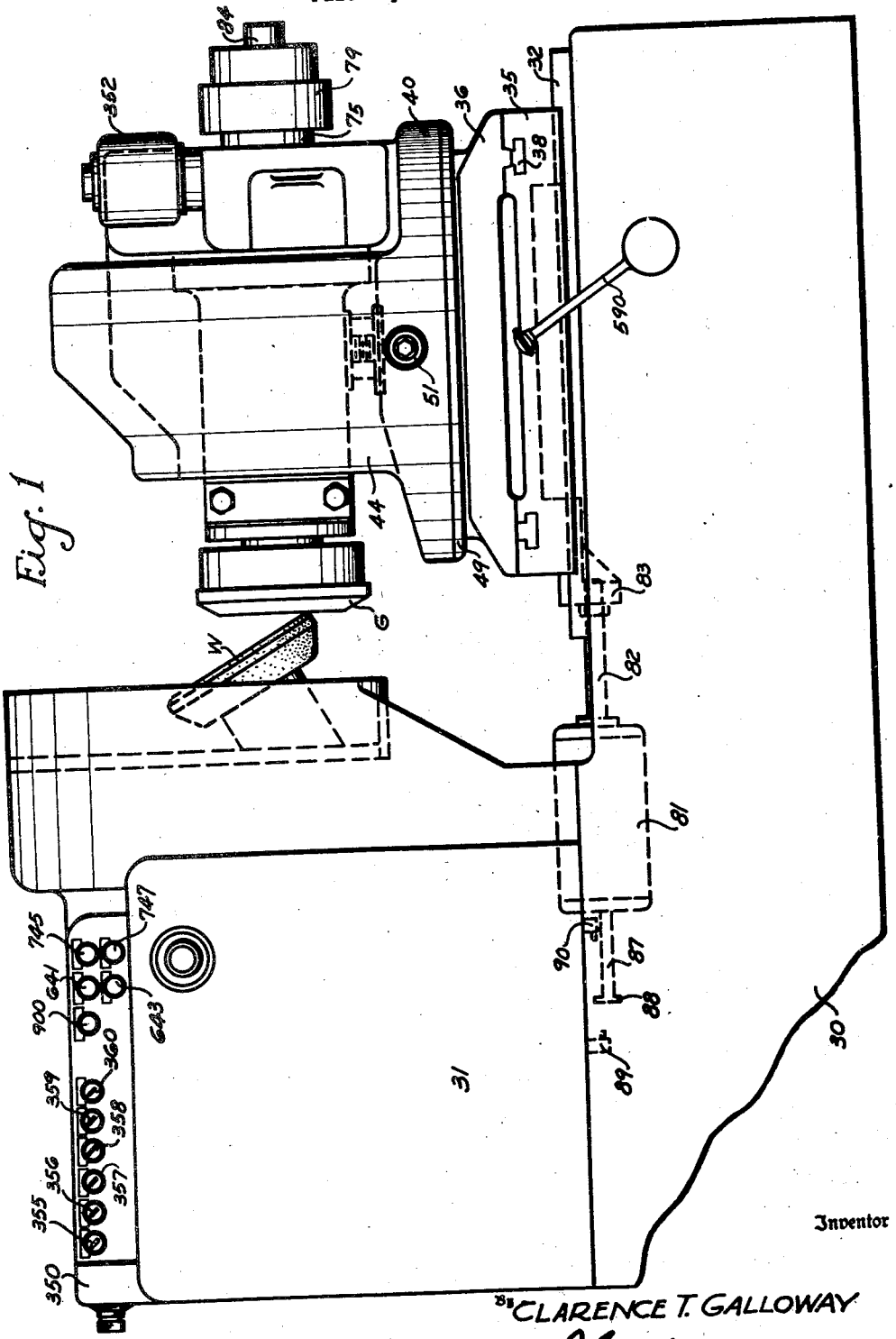
Figure 2:
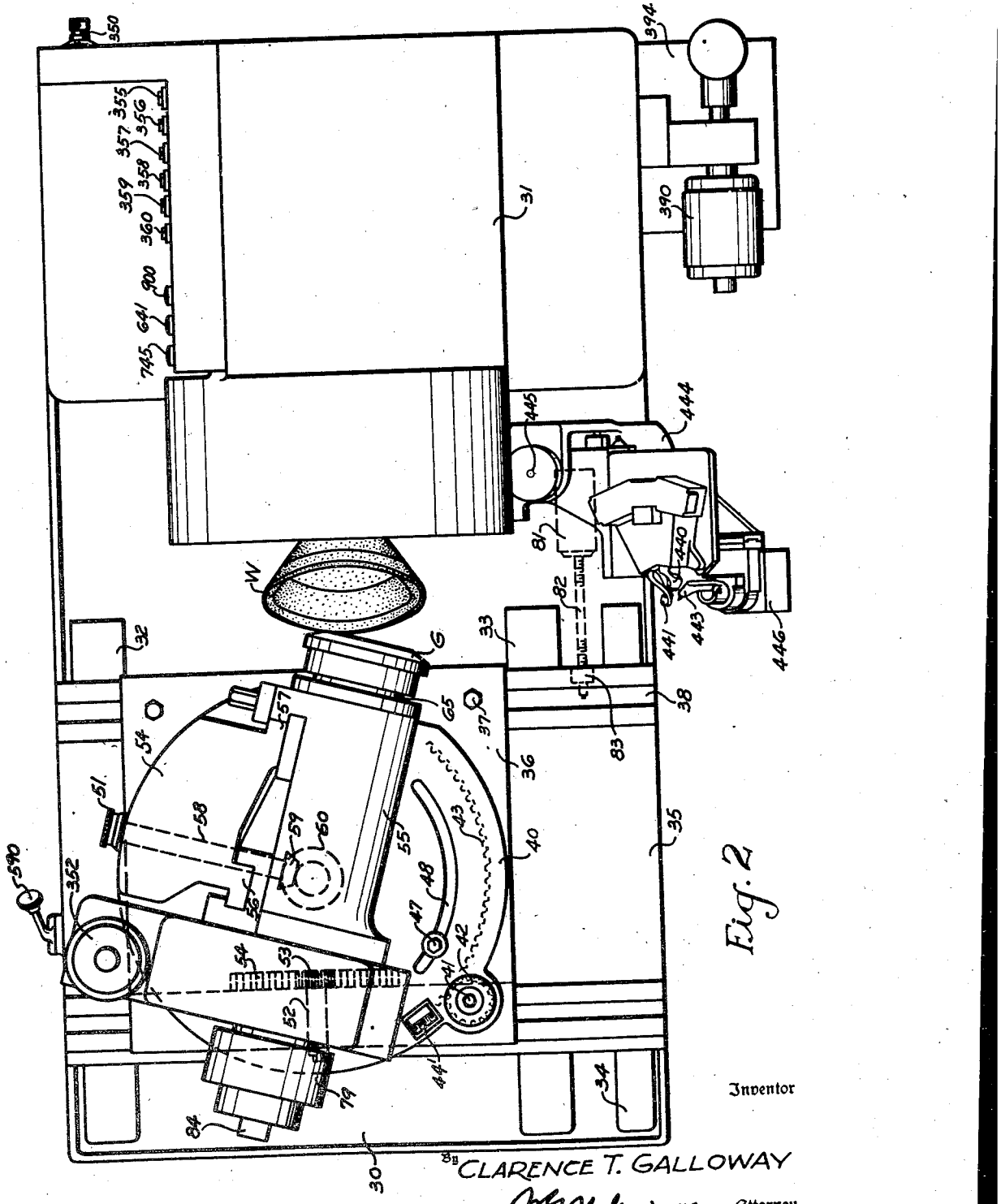
Fig. 2 is a top plan view of the machine.
Figures 3, 5:
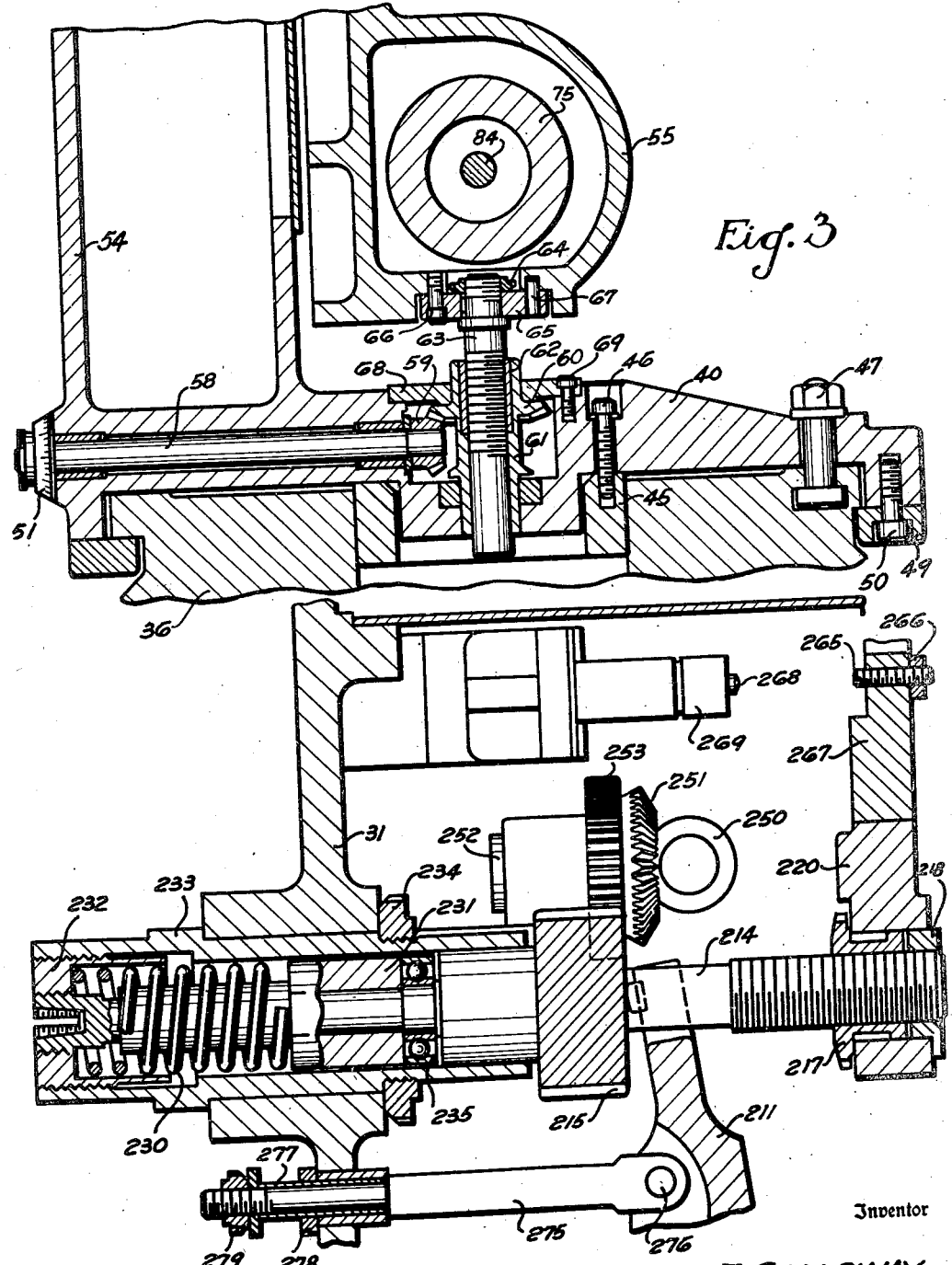
Fig. 3 is a fragmentary transverse vertical sectional view through the work support on a somewhat larger scale.
Fig. 5 is a fragmentary sectional view showing certain details of the feed mechanism of the machine.

Mounted on the slide 36 is a rotatably adjustable table 40 (Figs. 1, 2, and 3). This table is adapted to be adjusted angularly on the slide by rotation of a shaft 41 which carries a pinion 42. The pinion 42 meshes with a spur gear segment 43 which is secured to the slide. The spur gear segment 43 is coaxial of the centering bushing 45 (Fig. 3) by means of which the table is centered in the slide. The centering bushing 45 is secured to the table by screws 46. A graduated scale 44' (Fig. 2) serves to permit of precise adjustment of the table on the slide. The table is secured to the slide in any adjusted position by T-bolts 47 which pass through an arcuate slot 48 in the table and thread into the slide. A circular gib 49, which is secured to the table by screws 50 and which engages under a peripheral flange formed on the slide 36, also aids in securing the table in any adjusted position.

The table 40 has a column or upright 44 formed integral with it at one side. Mounted for vertical adjustment on this column is a workhead 55. This workhead slides on the ways 56 and 57 provided at one side of the column. It is adjusted vertically by rotation of a shaft 58 which is journaled in the table 40. This shaft has a bevel pinion 59 secured to its inner end which meshes with a bevel gear 60 that is integral with a sleeve 61. There is a nut 62 secured within the sleeve 61 to rotate therewith. This nut engages a screw shaft 63. The screw shaft 63 is secured by a nut 64 to a plate 65 that is fastened by screws 66 and a dowel pin 67 to the under face of the workhead 55. The sleeve 61 and shaft 63 are mounted coaxial of the centering bushing 45. The bevel gear 60 is held against axial movement by a bevel pinion 59 and a plate 68 which is secured by screws 69 to the table 40. Thus, by rotation of the shaft 58, workhead 55 can be adjusted vertically on the column 44. A dial gage 51 is keyed to the outer end of the shaft 58 so as to permit this adjustment to be made precisely.

Journaled in the workhead 55 in any suitable manner is a work-spindle 75 (Figs. 1 and 3). The axis of this work-spindle is perpendicular to the axis about which the table 40 is adjustable, and the axis of adjustment of the table intersects the axis of the work-spindle intermediate the ends of the work-spindle.

The gear G, which is to be ground, may be secured to the work-spindle to rotate therewith by any suitable type of chucking mechanism. As illustrated diagrammatically in Fig. 26, this chucking mechanism comprises a draw-bar 84 and a piston 78 which is secured to the draw-bar near its rear end. The piston 78 is adapted to reciprocate in a cylinder 79 that is secured in any suitable manner to the work-spindle 75 to rotate therewith. When fluid-pressure is applied to the front face of the piston 78, the draw-bar 84 is forced rearwardly in the work-spindle 75 to clamp the work securely to the spindle, while when fluid-pressure is applied to the rear face of the piston, the draw-bar is forced forwardly in the spindle to release the work.

The pressure fluid may be supplied to opposite faces of the piston 78 from ducts 70 and 71 (Fig. 26). These ducts communicate with peripheral grooves 72 and 73, respectively, formed in the rear half 74 of the cylinder which houses the piston 78. The grooves 72 and 73, respectively, communicate with ducts 76 and 77, respectively, which lead, respectively, to the front and rear faces of the piston.

The sliding base 35 is adapted to be moved from loading to operative position and vice versa by a piston 80 (Fig. 26) which is mounted for reciprocation in a cylinder 81 (Figs. 1, 2, and 26) that is mounted in the base 30. The piston has a rod 82 formed integral with it at one end which projects through the rear end wall of the cylinder 81. This rod has threaded engagement with a lug 83 that is secured to the sliding base 35. The pressure fluid may be supplied selectively to opposite ends of the piston 80 through ducts 85 and 86 to move the sliding base in one direction or the other on the frame 30. A rod 87 is formed integral with the piston 80 at the side opposite that to which the rod 82 is secured. The rod 87 projects through the forward end cap of the cylinder 81. This rod has an enlarged head 88 formed externally in the cylinder which is adapted to operate the limit switches 89 and 90 at opposite ends of the movement of the piston, as will be described more particularly hereinafter.

The grinding wheel W, which is cup-shaped as already stated, is secured to a spindle 95 (Figs. 4 and 25) that is journaled on suitable anti-friction bearings in a quill 96. The quill 96 is mounted in the column 31 for rotational and axial movement, and is supported therein on suitable bearings 97 and 98.

The grinding wheel W is driven from a motor 100 (Figs. 25 and 27) which may be mounted at any suitable point on the column 31. This motor drives a pulley 103 through a pulley 101 and a belt 102. The pulley 103 (Fig. 4) is keyed to a sleeve 105 which is journaled on suitable anti-friction bearings in a support 106. This support 106 is secured to one face of the column 31 by screws or other suitable means (not shown).

The sleeve 105 drives a shaft 104. This shaft has a rear end of reduced diameter which is splined and which has a sliding connection with the sleeve 105. The shaft 104 is journaled on suitable anti-friction bearings in the quill 96 co-axially of the quill.

To the forward end of this shaft 104 is keyed a bevel gear 107 which meshes with a bevel pinion 108. This pinion is fastened to a sleeve 109 that is keyed to the wheel spindle 95. By the means described, the wheel W may be rotated continuously so long as the motor 100 is in operation.

The quill 96 is adapted to be oscillated to swing the wheel back and forth across the face of the work to grind the tooth surfaces of the work for their full length. The oscillation of the quill is produced by operation of a motor 110 (Figs. 25 and 27). This motor may be mounted at any suitable point on the machine. The armature shaft of this motor is connected by a suitable coupling 111 with a shaft 112 to which is secured a bevel pinion 113. This pinion meshes with a bevel gear 114 that is secured to a shaft 115.

The shaft 115 (Figs. 25, 14, and 13) is journaled on suitable bearings in the column 31. At its outer end it has a spur pinion 116 secured to it. This pinion meshes with a spur gear 117 which has a splined connection with a stub shaft 118. This shaft is journaled in the column 31 and has a bevel pinion 120 keyed to its inner end. This pinion 120 meshes with a bevel gear 122 (Figs. 15 and 25) which is secured by screws 123 to a crank member 124.

The crank member 124 is integral with a shaft 125 that is journaled on suitable anti-friction bearings in the column 31. The crank member carries a radially adjustable crank pin 126 which may be secured in any position of adjustment on the crank by a T-bolt 127. Journaled on the crank pin 126 is a connecting rod 128 that is connected by means of a pin 129 with a link member 130. This link member is keyed to a shaft 131 that is journaled on suitable bearings in the housing 132 of a bevel gear differential which is suitably mounted in the column 31. Integral with the shaft 131 is one side gear 134 of the differential. The other side gear of this differential is denoted at 135, while the planetary pinions of the differential are designated 136 and 137, respectively. The pinions are suitably journaled in the differential housing 132 and are carried by a spider 138.

The side gear 135 of the differential is integral with a shaft 140 which is journaled on suitable anti-friction bearings in the differential housing 132. To the outer end of the shaft 140 is keyed a spur gear 141. This spur gear meshes with a spur gear segment 142 (Figs. 25 and 4) which is fastened in any suitable manner to a plate 143 that is keyed to the quill 96.

Through the means described, then, it will be seen that as the crank 124 revolves, an oscillatory motion will be imparted to the quill 96 to swing the grinding wheel back and forth across the face of the work.

The differential housing 132 is stationary during actual grinding. When it is desired to dress the wheel, however, the swinging motion of the wheel is stopped by stopping the motor 110 and crank 124. Then the differential housing is rotated to swing the wheel beyond its normal working path up to dressing position.

For movement of the housing to and from dressing position, a piston 150 (Figs. 13 and 26) is provided. This piston is mounted to reciprocate in a cylinder 151 which is secured to the column 31 by screws 152. The piston 150 has a piston-rod 154 secured to it which extends through the upper end wall of the cylinder. The projecting end of the piston-rod is threaded to engage a block 155 which is secured to a rack 156. This rack meshes with a spur gear segment 157 (Figs. 15 and 25) which is fastened by screws 158 to the differential housing 132.

Piston 150 is adapted to be operated hydraulically and the pressure fluid may be applied selectively to opposite sides of the piston through the ducts 160 and 161, respectively (Fig. 26). A coil spring 162 is interposed between the bottom face of the piston 150 and the bottom end wall of the cylinder 151. This spring serves as a cushion to take up vibration and back-lash in the differential gears 134 to 137 during grinding.

The rack 156 is guided in its reciprocating movement by two gibs 164 and 165 (Fig. 13) which are secured to the upright 31. The gib 164 is fastened to the column 31 by screws 167 while the gib 165 is secured to a plate 169 by screws 168. The plate 169 is fastened to the column 31 by bolts 173.

The gib 164 is graduated along one side. Secured to the back of the rack 156 or integral therewith, is a block 166. This block has an index mark which is readable against the graduations of the gib 164 to permit precise adjustment of the rack with reference to the piston-rod 154.

There is a limit switch 170 (Figs. 13 and 27) mounted on a bracket 171 which is secured by screws 172 to the plate 169. This limit switch is so mounted that its roller 175 lies in the path of travel of a block 174 which is secured on the piston-rod 154. The block 174 is generally cylindrical in shape but it has a conical lower end. When the piston 150 is in its lowermost position, the roller 175 of the limit switch is engaged with the cylindrical portion of the block 174 and the limit switch is held in the position shown in Fig. 27, but when the piston moves upwardly, the roller 175 rides down on the conical portion of the block 174 and the limit switch is allowed to shift position. The purpose of this limit switch will appear more clearly hereinafter.

Figure 6:
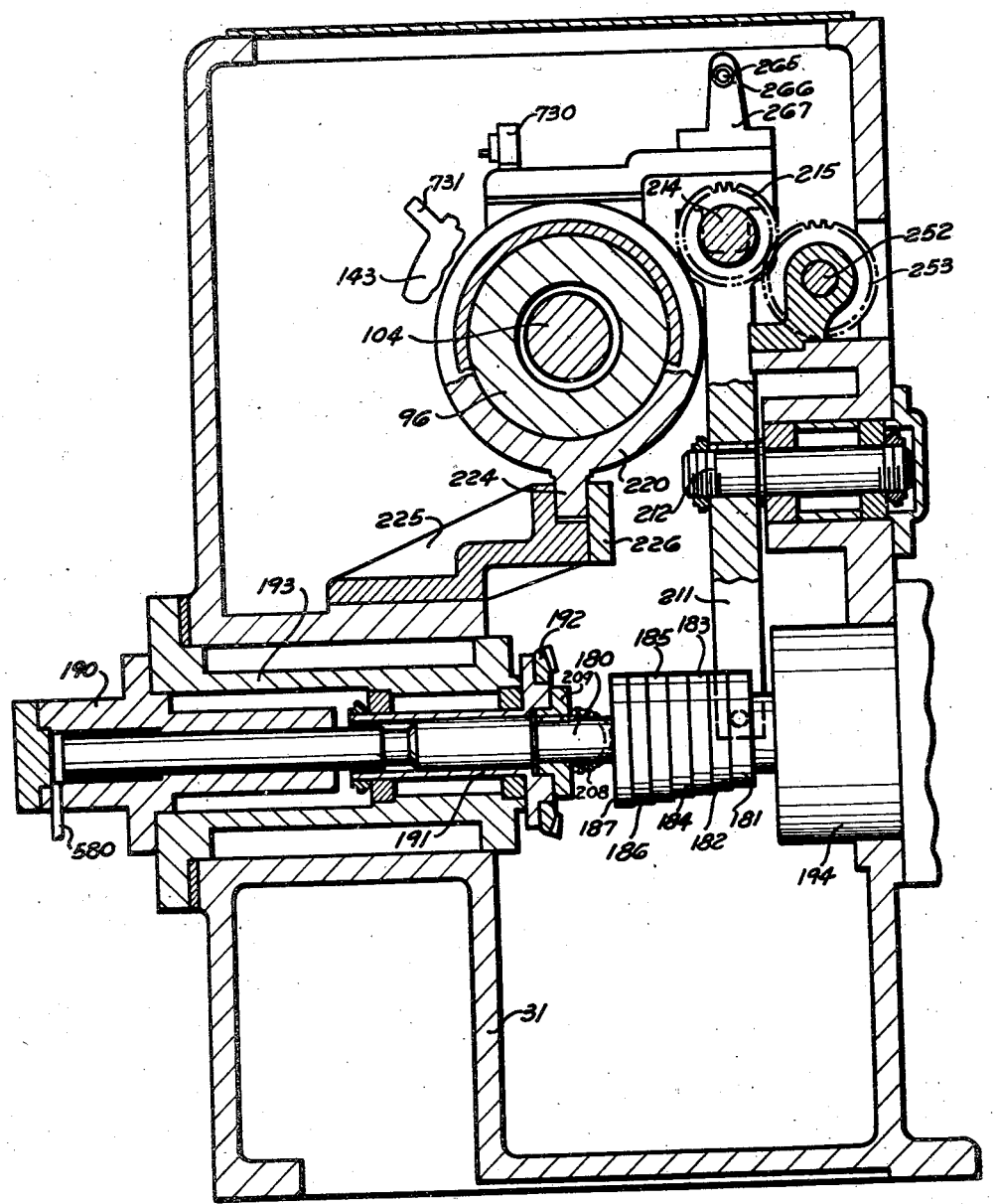
Fig. 6 is a vertical sectional view taken at right angles to the view of Fig. 4 showing further details of the feed mechanism of the machine.
Figure 7:
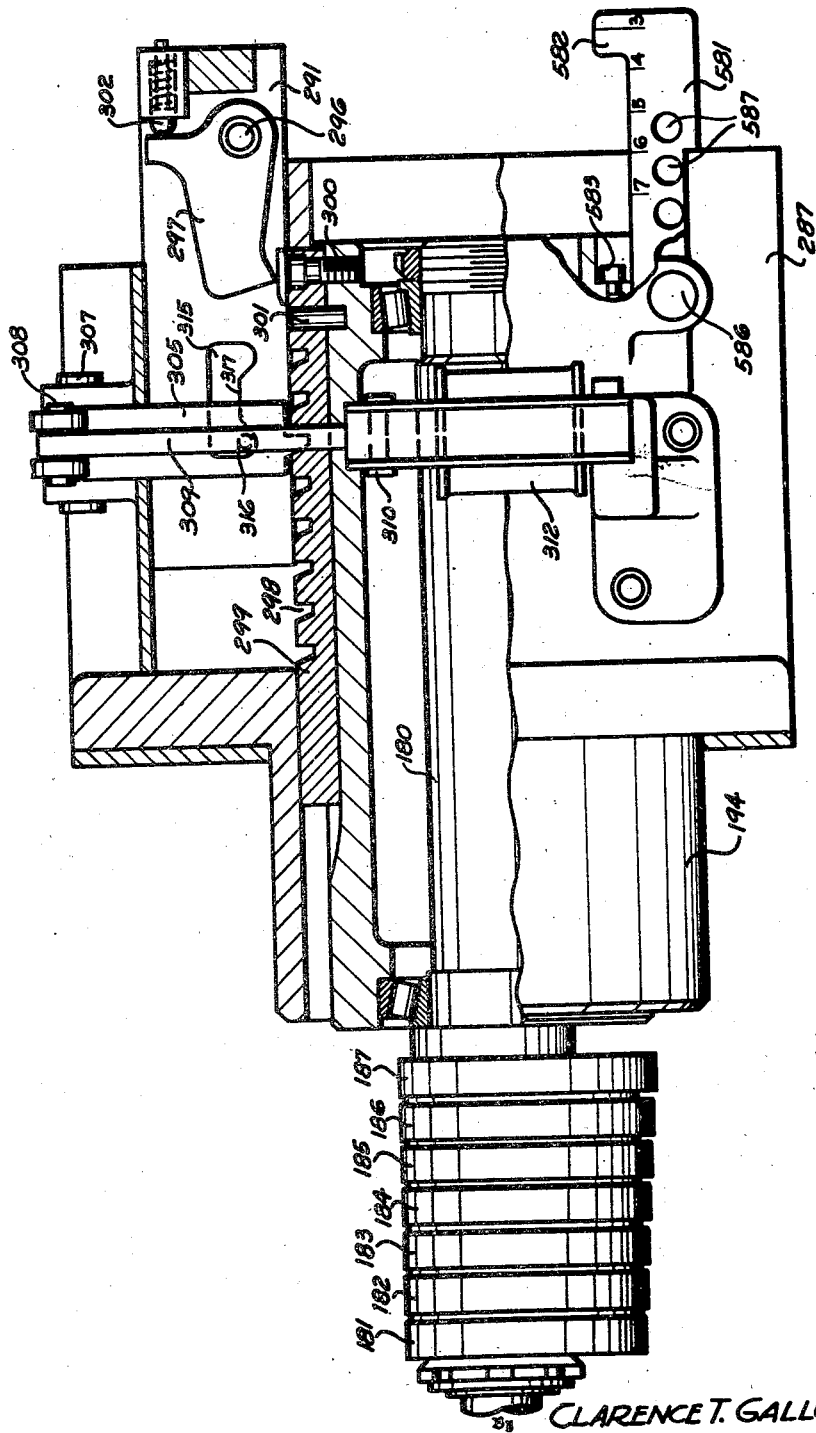
Fig. 7 is an enlarged view, with parts broken away, showing the feed cams and shaft, and part of the mechanism for shifting the shaft axially.

To grind the tooth spaces of a gear to the proper depth, the rotating and swinging wheel W is fed depthwise into the work, as already described. The depthwise feed movement is achieved by rotation of a shaft 180 (Figs. 25, 4, and 6) to which is secured the series of feed cams 181 to 187. One end of the cam shaft 180 extends into a cylinder 190 (Figs. 6 and 26) and operates as a piston against which fluid pressure may be applied to move the shaft axially. At its opposite end, the shaft 180 is journaled on anti-friction bearings in a sleeve 194 (Fig. 7). The shaft 180 is so mounted in the sleeve 194 that when the sleeve is moved axially the shaft is moved axially also. The cylinder 194 is mounted reciprocably in a casting 287 that is secured by screws 288 (Fig. 8) to the column 31. The sleeve 194 is adapted to be moved axially step-by-step to move the shaft 180 axially step-by-step in one direction to move the cams 181 to 187 successively into operating position. The shaft 180 is moved in the opposite direction in the cylinder 190 to return it to initial position as will be described more particularly hereinafter.

Figure 13:
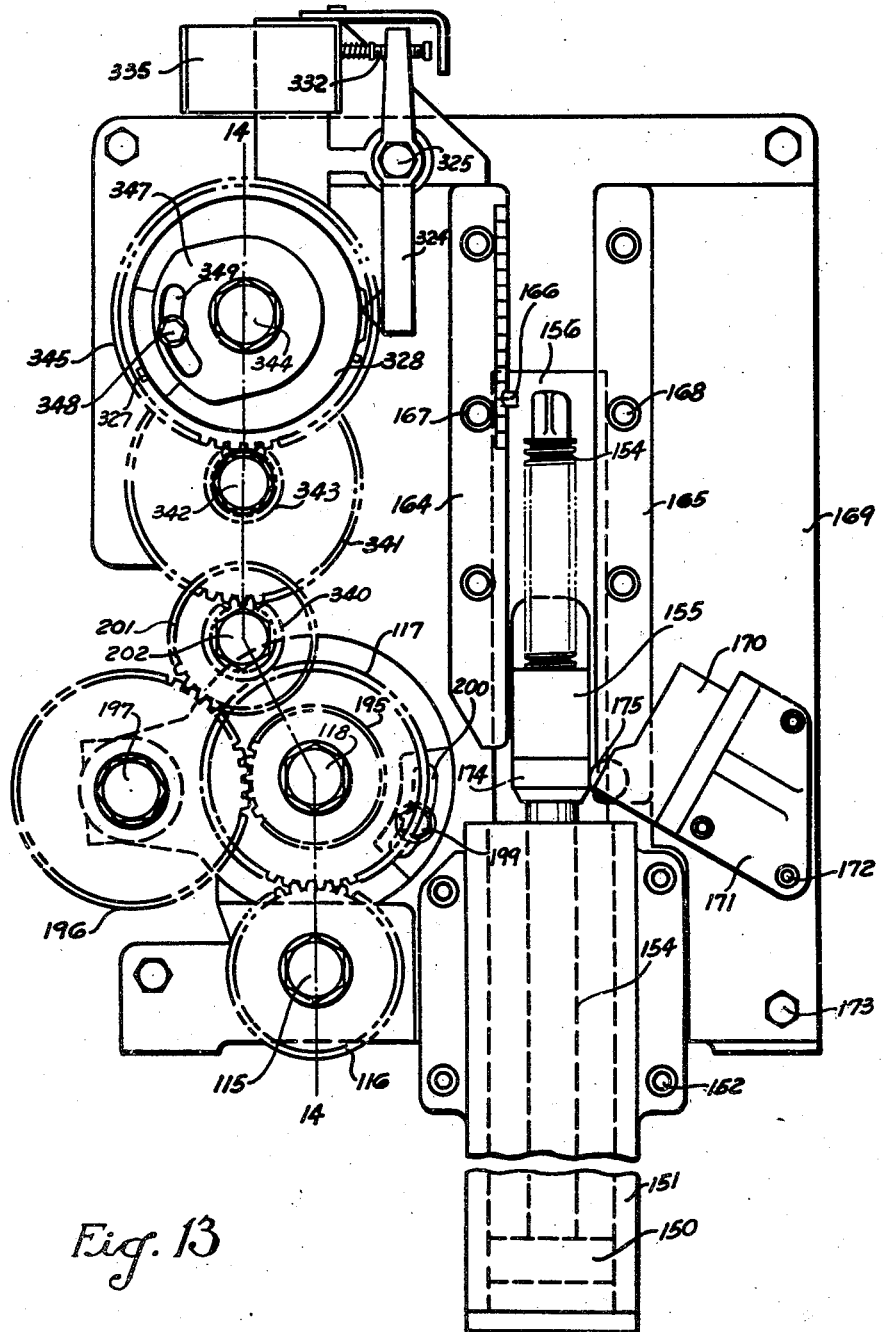
Fig. 13 is an elevational view showing in detail parts of the gear trains of the machine and, also, the mechanism for swinging the grinding wheel to and from dressing position.
Figure 15:
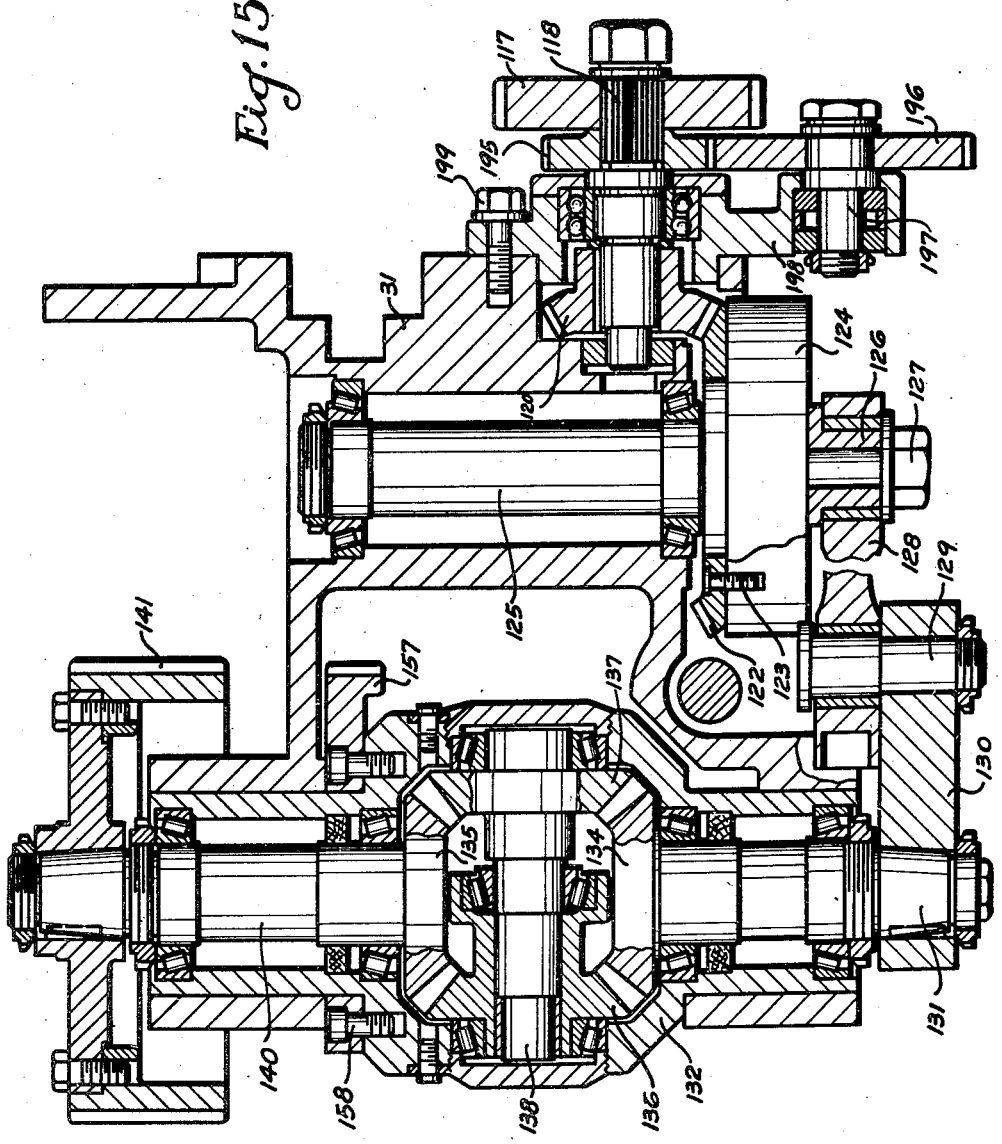
Fig. 15 is a fragmentary sectional view showing details of the mechanism for oscillating the grinding wheel and parts of other drives of the machine.

The shaft 180 is adapted to be driven from the shaft 118 (Figs. 25, 13, and 15). There is a spur pinion 195 which has a splined connection with the shaft 118. This spur pinion meshes with a spur gear 196 which is fastened to a stub shaft 197. The stub shaft 197 is suitably journaled in a quadrant 198. This quadrant is adjustably secured on the column 31 by means of a bolt 199 that passes through an arcuate slot 200 in the quadrant and that threads into the column.

The spur gear 196 meshes with and drives a spur gear 201 that is secured to one end of a shaft 202 which is suitably journaled in the column 31. To the other end of this shaft 202 is secured a bevel pinion 203 (Figs. 4 and 25) which meshes with a bevel gear 205 that is keyed to a shaft 206. The shaft 206 is journaled on suitable anti-friction bearings in a sleeve 207 that is secured in any suitable manner to the column 31.

There is a bevel pinion 208 secured to the inner end of the shaft 206. This bevel pinion meshes with a bevel gear 192 (Figs. 6, 4, and 25) which is fastened to a sleeve 191. This sleeve is fastened to a plate 209 that is keyed to and drives the shaft 180. The sleeve 191 is journaled in suitable anti-friction bearings in the sleeve 193, and the shaft 180 rotates and slides in the sleeve 191. The cylinder 190 is secured by screws or other suitable means (not shown) within the sleeve 193.

The feed cams 181 to 187 inclusive are all of the same general shape, but each successive roughing feed cam 181 to 186 inclusive is constructed to produce an increment of feed motion over the preceding roughing-feed cam, and the finishing-feed cam 187 may be provided with a dwell portion at full depth position to permit the grinding wheel to clean up the sides of the tooth spaces and produce finely finished surfaces. One of the feed cams, 181, is shown in elevation in Fig. 4. As will be seen, when it is revolved it will cause a feed and then a withdrawal movement per revolution.

When in operating position, each feed cam is adapted to engage a contact member 210 (Fig. 4) that is carried by the lower end of a lever 211. This lever 211 is keyed to a fulcrum pin 212 that is journaled on suitable anti-friction bearings in the upright 31 (Fig. 6). The upper end of the lever 211 is formed as a yoke to extend about a shaft 214 (Figs. 4, 5, and 6) and to engage against one side face of a long-faced spur gear 215 which is integral with the shaft 214.

The shaft 214 threads into a pair of nuts 217 and 218. These nuts have flanges on them which engage opposite side faces of a slidable bearing 220 (Figs. 4 and 6) which forms a support for the quill 96. The bearing 220 is secured against a shoulder on the quill 96 by a washer 221 and a nut 222 so that, as the bearing 220 is moved by reciprocation of shaft 214, the quill 96 is moved also. Thus, the motion of the lever 211 under actuation of any one of the feed cams 181 to 187 inclusive is transmitted to the quill 96 to feed the grinding wheel into engagement with the work and withdraw it therefrom.

The bearing member 220 is formed with an integral tongue 224 which slides in a guideway formed in a bracket 225 that is fastened in any suitable manner to the column 31. The tongue 224 is held in the guideway by a gib 226.

The lever 211 is held in engagement with each of the feed cams, during the time any particular feed cam is in operative position, by a coil spring 230 (Fig. 5) which surrounds the reduced portion of a thrust member 231 in which the shaft 214 is journaled. The coil spring is interposed between the head of this thrust member 231 and a nut 232 which threads into a sleeve 233 in which the spring and thrust member are mounted. The sleeve 233 is held against axial movement relative to the column 31 by a nut 234. A thrust bearing 235 is interposed between the head of the thrust member 231 and a shoulder formed on the shaft 214.

Each feed cam, as already described, is designed to effect, on each revolution, feed of the wheel into the work and withdrawal of the wheel from the work. The feed movement is a positive movement under actuation of the cam track. The withdrawal movement is produced by spring 230 under control of the cam track. To limit the withdrawal movement, there is a rod 275 (Fig. 5) pivotally connected at one end to lever 211 by means of pin 276. This rod is threaded at its opposite end into a nipple 277 that is adapted to slide in a stop sleeve 278 which is secured in an opening in column 31. The nipple 277 has a flange on it that engages the stop sleeve to prevent excessive withdrawal of the wheel from the work for indexing. A lock nut 279 which threads into rod 275 serves to hold nipple 277 in any adjusted position.

As the grinding wheel wears down, the quill 96 must be advanced axially to compensate for wheel wear. This advance is effected by rotation of the shaft 214, which causes the threaded portion of the shaft to rotate in the nuts 217 and 218 and advance the bearing member 220. Two separate nuts 217 and 218 are provided to take up backlash.

Figure 11:
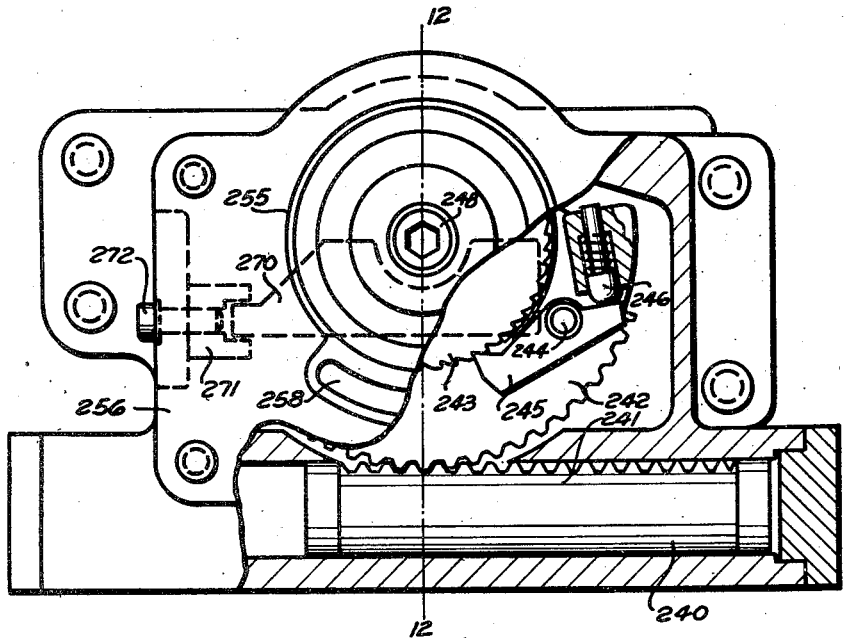
Fig. 11 is an enlarged view, with parts broken away, showing details of the mechanism for advancing the grinding wheel to compensate for wheel wear.
Figure 12:
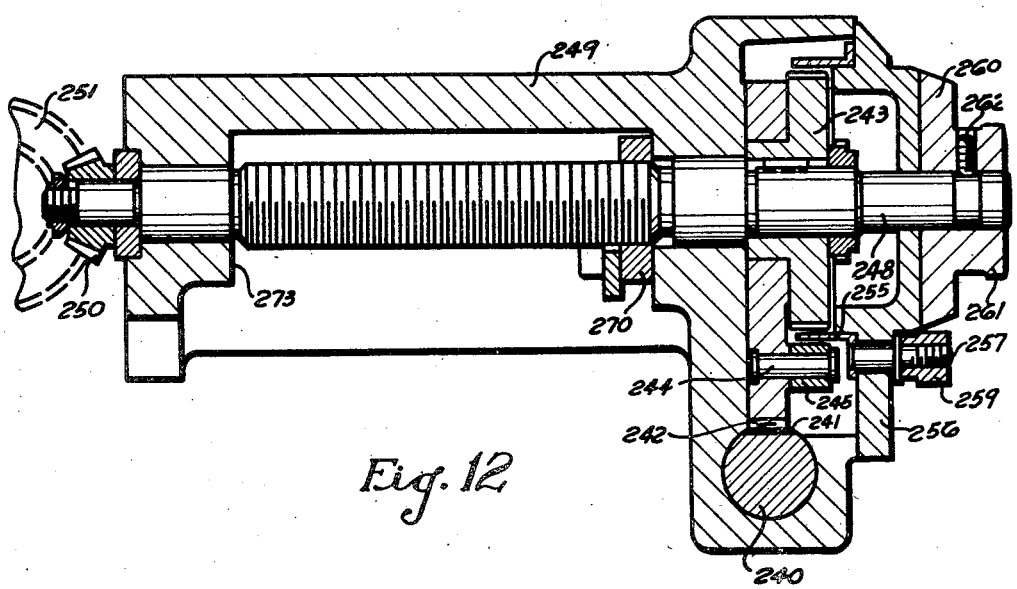
Fig. 12 is a section through this mechanism approximately on the line 12—12 of Fig. 11.

The rotation of the shaft 214 is effected at the desired intervals, to advance the wheel W prior to dressing as will be described more particularly hereinafter, through operation of a piston 240 (Figs. 11, 12, and 26). This piston has a rack 241 cut into one side which meshes with a spur gear segment 242 that is rotatably journaled on the hub of a ratchet wheel 243. Pivotally mounted by means of the pin 244 on one face of the spur gear segment is a pawl 245. This pawl is continuously pressed into engagement with the ratchet wheel by a spring-pressed plunger 246 which is housed in a boss formed on one side face of the spur gear segment 242. As the piston 240 is moved in one direction, then, the pawl 245 rotates the ratchet wheel 243.

The ratchet wheel is keyed to a shaft 248 which is suitably journaled in the bracket 249 that is secured to the column 31. There is a bevel pinion 250 keyed to the inner end of the shaft 248. This bevel pinion meshes with a bevel gear 251 (Figs. 12 and 5) that is secured to a shaft 252 that is suitably journaled in the column. There is a spur pinion 253 integral with bevel gear 251. This pinion meshes with spur gear 215. Thus, as the ratchet wheel 243 is revolved, the shaft 214 is rotated to move the sliding member 220 and quill 96 axially of the quill to feed the grinding wheel forward to compensate for wheel wear.

The wide-faced gear 215 permits maintenance of the drive between gears 253 and 215 despite advance of the wheel.

The amount of feed movement of the grinding wheel at each stroke of the piston 240 can be adjusted by adjusting the guard 255 (Figs. 11 and 12) which is rotatably adjustable on a cap member 256 that is secured to one end face of the bracket 249. The guard 255 has a slot in it through which the pawl 245 may project to engage the ratchet wheel 243. A screw 257, which passes through an arcuate slot 258 in the guard, and a knurled nut 259 serve to secure the guard in any adjusted position. For manual adjustment of the position of the grinding wheel a graduated dial 260 having a knurled knob 261 is provided. This is secured to the shaft 248 by a set-screw 262.

To prevent further advance of the grinding wheel when it is worn down to its safe limit, a stop-screw 265 (Fig. 5) is provided. This screw is adjustably secured by means of the nut 266 in a plate 267 that is fastened in any suitable manner to the bearing member 220. When the grinding wheel has been advanced by movement of the bearing member 220 and quill 96 to the point where it is completely worn down, the stop-screw 265 engages the plunger 268 of a normally-open limit switch 269 (Figs. 5 and 27). When this happens, the limit switch 269 is closed, opening the circuit to the dressing cycle motor and preventing starting of that motor and further dressing of the wheel, as will be described more particularly hereinafter.

As a further safety feature, the shaft 248 (Fig. 12) is threaded to engage a half nut 270. This nut is held against rotation by a forked member 271 (Fig. 11) which engages over an extension of the nut, and which is secured in the bracket 249 by a screw 272. The thread formed on the shaft 248 is much coarser than the thread formed on the shaft 214 (Fig. 5) with the result that the nut 270 will strike the face 273 of the bracket 249 before the bearing member 220 is threaded completely along the shaft 214. Hence, rotation of the shaft 248 and of the shaft 214 will be stopped before the sliding member 220, quill 96, and grinding wheel W have been advanced too far. The hydraulic system will, of course, take up the thrust as soon as the nut 270 abuts the face 273 of the bracket 249.

As already described, after all of the tooth spaces of the work have been ground to a given depth under control of one of the feed cams and the work has been indexed through a complete revolution, the feed cam shaft 180 (Figs. 6 and 7) is shifted axially to bring the next feed cam into operative engagement with feed lever 211. Then a new grinding cycle is started during which each of the tooth spaces of the work is reground to a greater depth under control of the newly positioned feed cam. Thus the grinding operation proceeds with the work ground progressively to greater and greater depth under control successively of the different feed cams.

The shifting of the feed cam shaft is effected by movement of a piston 285 (Figs. 10 and 26) which is reciprocable in a cylinder 286 formed in the casting 287 (Fig. 8). The piston 285 has a piston-rod 289 integral with it which extends outwardly through an opening in the packing gland 290 that forms one end wall of the cylinder 286. There is an L-shaped plate 291 secured to the projecting end of the piston-rod 289 by a nut 292. One leg 294 of this plate fits over the projecting end of the piston-rod and seats against a spacer 295. On the other leg of the plate is pivotally mounted by means of the pin 296 (Figs. 10 and 7) a pawl 297. This pawl is adapted to engage in the spaces 298 of a ratchet bar 299 that is fastened to the cylinder 194 by a screw 300 and dowel pin 301. A spring-pressed plunger 302 serves to urge the pawl 297 constantly into engagement with ratchet bar 299. As the piston 285 is moved in one direction in the cylinder 286, therefore, the pawl 297 is engaged with the ratchet bar 299 to advance the shaft 180 axially step-by-step and bring the feed cams 181 to 187 inclusive successively into operative position.

The cylindrical member 194 is locked in adjusted position during a grinding cycle by a lock-dog 305 which also engages in the tooth spaces of the ratchet bar 299. This lock-dog is pivotally connected at its upper end to a lever 306 (Figs. 7, 8, and 10). This lever is pivotally mounted intermediate its ends on the casting 287 by means of the pivot pin 307. The opposite end of the lever is pivotally connected by means of the pin 308 with a bar 309 that is connected by the pin 310 to the armature of a solenoid 312.

A spring pressed plunger 313 (Fig. 8), which engages the under side of the lever 306, serves to hold the lock-dog 305 normally in locking position, but when the solenoid 312 is energized, as will be described hereinafter, the lock-dog is withdrawn from locking position. The solenoid 312 is actuated only after the grinding operation has been completed when it is desired to return the feed cam shaft axially to its starting position.

To disengage the locking-dog 305 from locking position for step-by-step indexing of the feed cam shaft, there is a slot 315 (Fig. 7) provided in the plate 291, and the lock-dog 305 has a pin 316 secured to it which engages in this slot. This slot is so shaped that when the plate 291 is moved to the left in Fig. 7 under actuation of the piston 285, in the indexing operation, the pin 316 rides up on an incline of the bottom wall 317 of the slot and onto a dwell portion, while at the end of the indexing movement it rides down an incline again to allow the lock-dog to drop into engagement with a new tooth space of the ratchet bar 299 next to that with which it has previously been engaged. Thus the lock-dog is disengaged from the ratchet bar 299 for indexing against the resistance of the spring-pressed plunger 313 (Fig. 8).

As already described, as the feed cam shaft 180 revolves, the feed cam, which is in operative position, produces on each revolution of the cam shaft a feed of the grinding wheel into the work and withdrawal of the grinding wheel from the work. During withdrawal the work is indexed. The indexing mechanism used on the machine may be of any suitable character and has not been specifically illustrated. It may be, for instance, of the construction disclosed in the pending U. S. application of Edward W. Bullock, Serial No. 516,040, filed December 29, 1943, now Patent No. 2,386,432, issued October 9, 1945. This index mechanism is of the notched plate type. It comprises a notched index plate, which is secured to the work-spindle, and a locking-dog, which is adapted to engage in the notches of the index plate and which serves to lock the work-spindle against rotation during a grinding operation on the work. To effect indexing, the locking dog is disengaged from the plate, a pawl, which is carried by an oscillatory arm, is engaged with a notch of the plate, and the arm is oscillated to rotate the spindle through the angular distance required for indexing. Then the lock-dog is re-engaged with the plate to lock the work-spindle again.

In the indexing mechanism of the Bullock patent, the locking-dog is disengaged through operation of a solenoid which is energized at proper intervals. A solenoid for this purpose is denoted diagrammatically at 770 in Fig. 27. To insure that the locking-dog is released again in time to engage the notch of the indexing plate next to the notch with which it has previously been engaged, a limit switch is provided. This limit switch is intended to be tripped to deenergize the solenoid 770 after the arm, which carries the indexing pawl, has been set in motion to effect the indexing movement. A limit switch for this purpose is denoted diagrammatically at 761 in Fig. 27.

Figure 14:
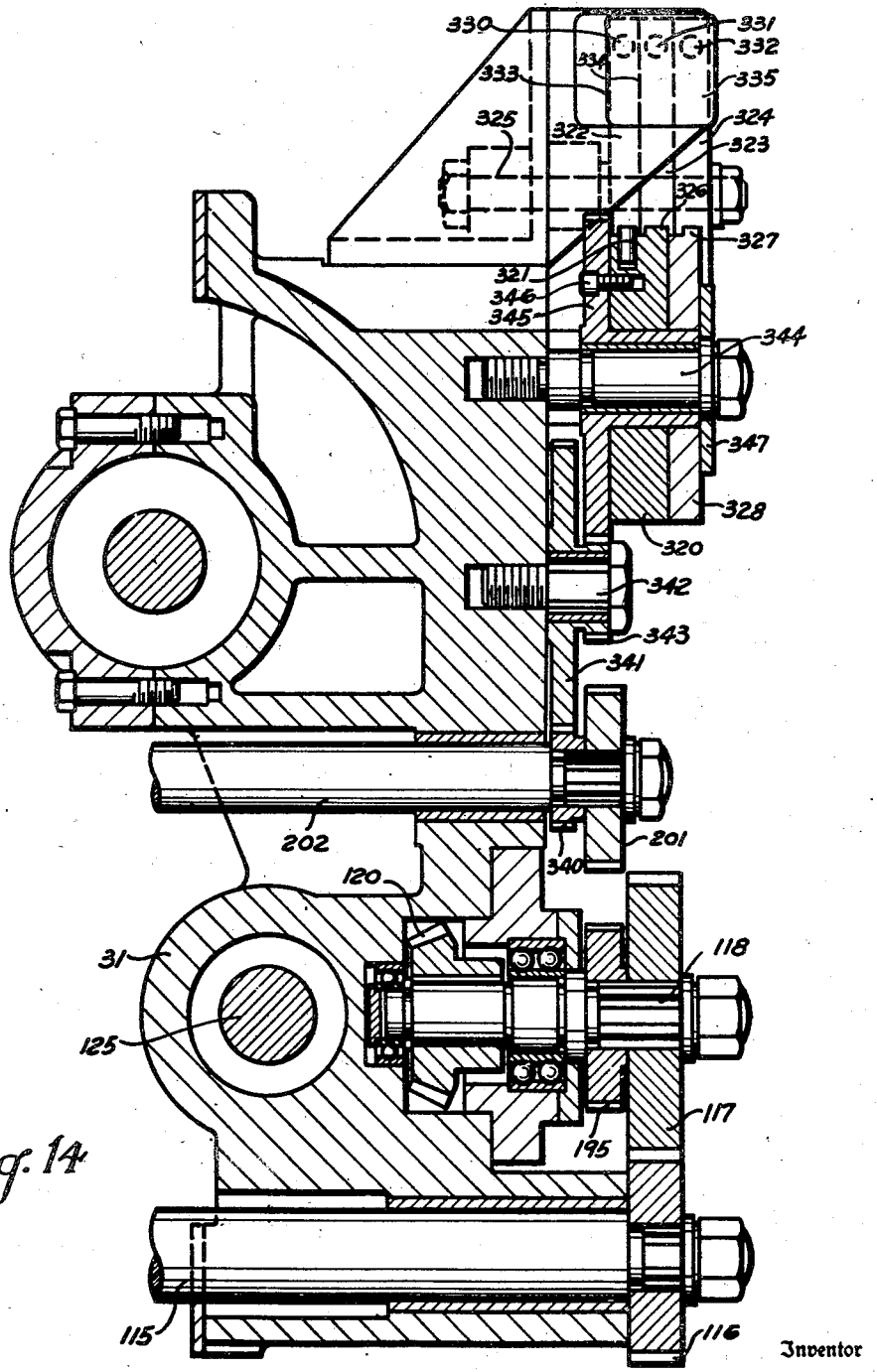
Fig. 14 is a section approximately on the line 14—14 of Fig. 13.

If the index mechanism of the Bullock patent is used on the machine of the present invention, the index solenoid may be energized at the proper point in each feed cycle through operation of a rotary cam plate 320 (Figs. 14 and 24) which has a pin 321 thereon that is adapted to engage and rock a lever 322 as the cam plate revolves. The lever 322 is mounted, with two other levers 323 and 324 on a stud 325 that is secured in the upright 31. The lever 323 is adapted to be rocked by the lobe portion 326 of the rotary cam plate 320, while the lever 324 is adapted to be rocked by a lobe 327 formed on a rotary cam plate 328 (Figs. 13, 14, and 23). Each of the levers engages with the spring-pressed plunger of a limit switch. The three spring-pressed plungers are denoted at 330, 331, and 332, respectively, and the three limit switches are denoted at 333, 334, and 335, respectively.

The limit switch 335 is adapted to operate the solenoid 312 (Figs. 7 and 27). The limit switch 333 is adapted to operate the solenoid 770 (Fig. 27) which releases the work-index lock-dog, and the limit switch 334 is adapted to insure that the grinding wheel is in withdrawn position during dressing as will be described more particularly hereinafter. It is essential that the wheel always be in the same relative position during dressing in order to insure that the wheel be dressed back the correct amount, and this limit switch 334 insures this.

The two cam plates 320 and 328 are adapted to be driven in time with the rotation of the feed cam shaft 180 so as to make one revolution per revolution of the feed cam shaft so that the work-index mechanism may be tripped periodically at the proper time with each tooth space forming or feed cycle. The drive to the cam plates 320 and 328 is from the shaft 202 (Figs. 25, 13, and 14). This shaft has a spur pinion 340 splined to it. The spur pinion 340 meshes with a spur gear 341 that is journaled on a stud 342 which is threaded into the upright 31. There is a spur pinion 343 integral with the spur gear 341. This spur pinion meshes with a spur gear 345 which is secured by a screw 346 to the cam plate 320 and which is journaled on a stud 344 that is threaded into upright 31. Cam plate 328 is secured to the cam plate 320 by another screw (not shown). The two cam plates 320 and 328 are mounted on the hub of the spur gear 345. Through the gearing described, the index mechanism will be tripped once in each tooth forming cycle to index the work. For effecting the actual indexing movement, a motor 352 may be provided (Figs. 1, 2, and 27).

There is a cam plate 347 secured to the outside face of the cam plate 328 by a bolt 348 which passes through an arcuate slot 349 in the cam plate 347 and threads into the cam plate 328. This cam plate is adapted to trip the automatic stop of the machine through any suitable connection. The automatic stop may be of conventional construction and is denoted in Fig. 1 at 350.

After a grinding operation has been performed on each tooth space of the work, that is, after the work has been indexed through a revolution, the feed cam shaft is shifted axially, as already described, to bring a new feed cam into operative position. Whether the only operation between successive grinding cycles is to be shifting of the feed cam shaft, or whether the wheel is to be dressed in addition is determined by the adjustments of a series of selector switches. There are six selector switches provided on the machine, one for each of the six intervals between the seven possible grinding cycles of the machine. The selector switches are denoted 355, 356, 357, 358, 359, and 360, respectively (Figs. 1, 2, and 27).

Each selector switch is adjustable manually by the operator to any one of three different positions. These are so-called "grind" position, in which case the only operation, which will take place in the interval between grinding cycles, will be shift of the feed cam shaft, "rough-dress" position, in which case, not only will the feed cam shaft be shifted axially but the wheel will also be rough-dressed in the interval between grinding cycles, and "finish-dress" position, in which case, in addition to the shift of the feed cam shaft, the wheel will be finish-dressed in the interval between grinding cycles.

There are a series of seven limit switches 362 to 368 inclusive (Figs. 9 and 27) provided on the machine. The cylinder 194 (Figs. 7 and 9) carries a button 370 which is adapted to engage successively the heads of spring-pressed plungers 372 to 378 inclusive as the cylinder 194 is indexed axially in the step-by-step axial movement of feed cam shaft 180. The spring-pressed plungers 372 to 378 inclusive engage, respectively, at their inner ends with the free ends of levers 382 to 388 inclusive. One of these levers is shown in the sectional view of Fig. 8. Each lever 382 to 388 inclusive is pivoted on a pin 389 mounted in the casting 287. The several levers engage the plungers of the several limit switches 362 to 368 inclusive. Hence, as the cylinder 194 is indexed step-by-step, the button 370 comes into engagement successively with the heads of the spring-pressed plungers 372 to 378 inclusive and successively trips, therefore, the limit switches 362 to 368 inclusive. These several limit switches effect the operations which are to take place in the intervals between grinding cycles as will be described more particularly hereinafter.

When any one of the selector switches 355 to 360 inclusive (Fig. 1) is adjusted to its rough dressing or to its finish dressing position, then in the interval between grinding cycles when that particular switch becomes operative, the feed motor 110 (Figs. 25 and 27) is stopped, the sliding base is withdrawn from operative position, the grinding wheel is swung beyond its normal working path to dressing position, the grinding wheel is advanced by movement of quill 96 to compensate for the amount of stock which is to be dressed off the wheel, the dressing mechanism is swung into dressing position and actuated to dress the wheel, then the dressing mechanism is swung out to inoperative position again, the sliding base is returned to operative position, the wheel is returned to working position, and the feed motor is restarted. All of these functions are performed through operation of a motor 390 (Figs. 2, 16, and 27) and of several cams 401, 402, and 403 (Figs. 17 and 20 to 22 inclusive) which are driven by that motor.

The motor 390 is mounted on a housing 394 which is secured at one side of the machine. It has its armature shaft connected by a suitable coupling 391 to a shaft 392. The shaft 392 is journaled on suitable anti-friction bearings in the housing 394 and has a bevel pinion 395 integral with it. This pinion meshes with a bevel gear 396 that is keyed to a shaft 397. The shaft 397 is journaled on suitable anti-friction bearings in the housing 394. Integral with the lower end of this shaft 397 is a worm 398. This worm meshes with a worm wheel 399 (Fig. 17) that is keyed or otherwise secured to a shaft 400 that is journaled in the housing 394. The shaft 400 has the three cams 401, 402, and 403 keyed thereto (Figs. 17, 20, 21, and 22) and spaced from one another by spacers 404 and 405.

The cam 403 is of generally cylindrical shape but has three lobes on it, which are denoted at 407, 408, and 409. These lobes are spaced from one another axially of the shaft 400 and also have different angular positions about the shaft axis. The lobe portion 407 and the cylindrical portion of the cam which is axially aligned with that lobe portion are adapted to engage the hardened nose 410 (Fig. 18) of a lever 411 which is pivoted at 412 in the housing 394. The back side of the lever 411 engages a spring-pressed plunger 414 that is mounted in a casting 415 which is secured to the housing 394. This plunger 414 engages at its opposite end with the plunger of a limit switch 416 (Figs. 17 and 27). The spring 417 serves to urge the lever 411 in one direction about its pivot 412. The movement of the lever arm in this direction is limited by an adjustable stop screw 418 which is carried by a bracket arm 419 that is secured by screws 420 to the bracket 415.

The limit switch 416 controls the operation of a solenoid 524 (Figs. 26 and 27) as will hereinafter be described. This solenoid operates, when energized, to shift the reverse valve 520 (Fig. 26) to cause the sliding base 35 to be moved away from operative position. This permits the work to clear the dressing mechanism, as will be described hereinafter.

The lobe 408 of cam 403 is adapted to operate a lever 422 (Fig. 17) which is journaled on the shaft 412 in the same manner as the lever 411. This lever is connected operatively with a limit switch 423 (Figs. 17 and 27) through a spring-pressed plunger 424 in the same manner as the connection between the lever 411 and the plunger 414. The limit switch 423 is a normally closed limit switch and when it is opened by action of the lobe 408, the dressing cycle motor 390 is stopped, as will be described more particularly hereinafter, ending the dressing cycle. The lobe 408 is so positioned on the cam 403, therefore, as to allow completion of the dressing operation, in those intervals when the wheel is dressed, before stopping the motor 390 again.

The lobe 409 of the cam 403 is adapted to operate a lever 425 similar to the lever 411 and journaled on the shaft 412 in a manner similar to the lever 411. The lever 425 is connected operatively with a limit switch 426 (Figs. 17 and 27) through a spring-pressed plunger 427 in a manner similar to the connection between the lever 411 and the plunger 414. The limit switch 426 is a normally open limit switch and when it is closed by action of the cam lobe 409, the feed motor 110 is started to start a new grinding cycle.

The dressing mechanism employed on the machine of the present invention may be of any suitable type. As illustrated it is of the same general type as disclosed in the U. S. Patent to Wildhaber et al. No. 2,366,139, issued December 26, 1944. In the dressing mechanism of this patent, there are three dressing diamonds employed, one for dressing each side of the wheel, and the third for dressing the tip of the wheel. The two side dressers are carried by swingable arms, such as denoted at 440 and 441 in Fig. 2 of the present application, and the tip dresser is carried by a third swingable arm such as denoted at 443. These arms are fluid-pressure actuated to effect the dressing of the sides and tip of the wheel. The tip dresser arm 443 is mounted in a bracket 446 which is pivotally mounted on a support 444 while the side dresser arms 440 and 441 are swingably mounted directly in the support 444 itself. The support 444 is mounted on the column 31 for swinging movement about an axis 445. The pivotal movement of the support 444 is for movement of the dressers into and out of dressing position, as described in the Wildhaber et al. patent. The pivotal movement of the tip dresser bracket 446 is to permit the tip dresser to be swung away from the wheel on the return swing of the top dresser arm 443 so that the top dresser may dress on the swing of the dresser arm 443 in the forward direction only, as described in the Wildhaber patent.

The movements of the dresser support 444 into and out of operative position are controlled by a rotary piston 450 (Fig. 26). This piston is adapted to swing in a cylinder 451 containing a partition member 452 that is secured to the inside wall of the cylinder. The construction is the same as shown in the Wildhaber et al. patent. The movement of the piston 450 is used also, however, in the machine of the present invention to trip a limit switch 453 (Figs. 26 and 27) whose function will be described more particularly hereinafter. This limit switch may be tripped through operation of a plunger 454, which is mounted to reciprocate in registering openings drilled through the wall of the cylinder 451 and through the partition member 452. The plunger has a conical shaped inner end that is adapted to seat in one or other of the conical shaped recesses 455 and 456, respectively, formed in a portion of the piston member 450, which is of reduced diameter. The plunger 454 is adapted to ride on the periphery of this portion of the piston during swing of the piston and it is adapted to seat in the recesses 455 and 456 at opposite ends of the swing of the piston.

The limit switch 453 is a normally closed limit switch. Hence when the plunger 454 is seated in one of the recesses 455 or 456, the limit switch is closed, while when the plunger is riding on the periphery of the piston 450, the limit switch is open. During the time that the limit switch is open, the motor 390 will be stopped, as will be described more fully hereinafter, to insure sufficient time for swing of the dressing mechanism into and out of dressing position.

The side dressers are adapted to be actuated, when the dressing mechanism is in operative position, by movement of a piston 460 (Fig. 26) which has two racks cut into its periphery at angularly spaced points. These racks engage with pinions that are secured to the side dresser arms 440 and 441, the construction being the same as described in the Wildhaber et al. patent. Only one of the pinions is shown diagrammatically in Fig. 26 where it is denoted at 461.

The dresser arm 440 is adapted to operate a limit switch 462 (Figs. 26 and 27) the purpose of which will appear hereinafter. This limit switch is operated through a plunger 463 which is reciprocable through an opening in the bracket 464 in which the dresser arm 440 is journaled. This plunger is adapted to engage in one or other of two spaced recesses 466 formed on the periphery of a portion of the arm 440, which is of reduced diameter, when the dresser arm is at one end or the other of its dressing movement. The plunger is adapted to ride on the periphery of this reduced portion of the arm 440, as the arm swings in its dressing movement.

The limit switch 462 is a normally closed limit switch. Hence when the plunger is seated in one of the recesses 461, the limit switch is closed, while when the plunger is riding on the periphery of the arm 440, the limit switch is open. During the time that the limit switch is open, the motor 390 will be stopped, as will be described more fully hereinafter, to permit the dresser arms to complete their swings regardless of the rate at which the dressers may move across the wheel.

The tip dresser is adapted to be swung back and forth, when the dressing mechanism is in operative position, by operation of a piston 470 (Fig. 26) which is reciprocable in a cylinder 471 and which has rack teeth cut into one side of it that engage a pinion, which is connected to the tip dresser arm 443. The construction is the same as described in the Wildhaber et al. patent.

As already stated, the support 446 for the tip dresser and its operating piston and cylinder is pivotally mounted on the swinging support 444 that carries the whole dressing mechanism. The tip dresser is adapted to be held in engagement with the dressing wheel on the forward or dressing stroke of the piston 470 by operation of a piston 473 which is reciprocable in a cylinder 474. The rod portion 475 of this piston is adapted to project through one end wall of the cylinder 474 and to engage a hardened abutment 476 that is secured to the support 444. Thus, when the piston 473 is moved to the right in Fig. 26, the tip dressing mechanism will be held in engagement with the grinding wheel, while when it is moved to the left, the tip dresser will be swung about the axis 478 away from the wheel through operation of a spring 476, as described in the Wildhaber et al. patent, so that the tip dresser does not dress on its return stroke. The movements of the piston are controlled by a shuttle valve 477 in a manner similar to that described in the Wildhaber et al. patent.

The dressing mechanism disclosed in the drawings differs from the dressing mechanism of the Wildhaber et al. patent, however, in the controls for operation of the dressing mechanism. These controls are quite similar to those employed in the machine of my pending U. S. patent application Serial No. 506,946, filed October 20, 1943.

Figure 16:
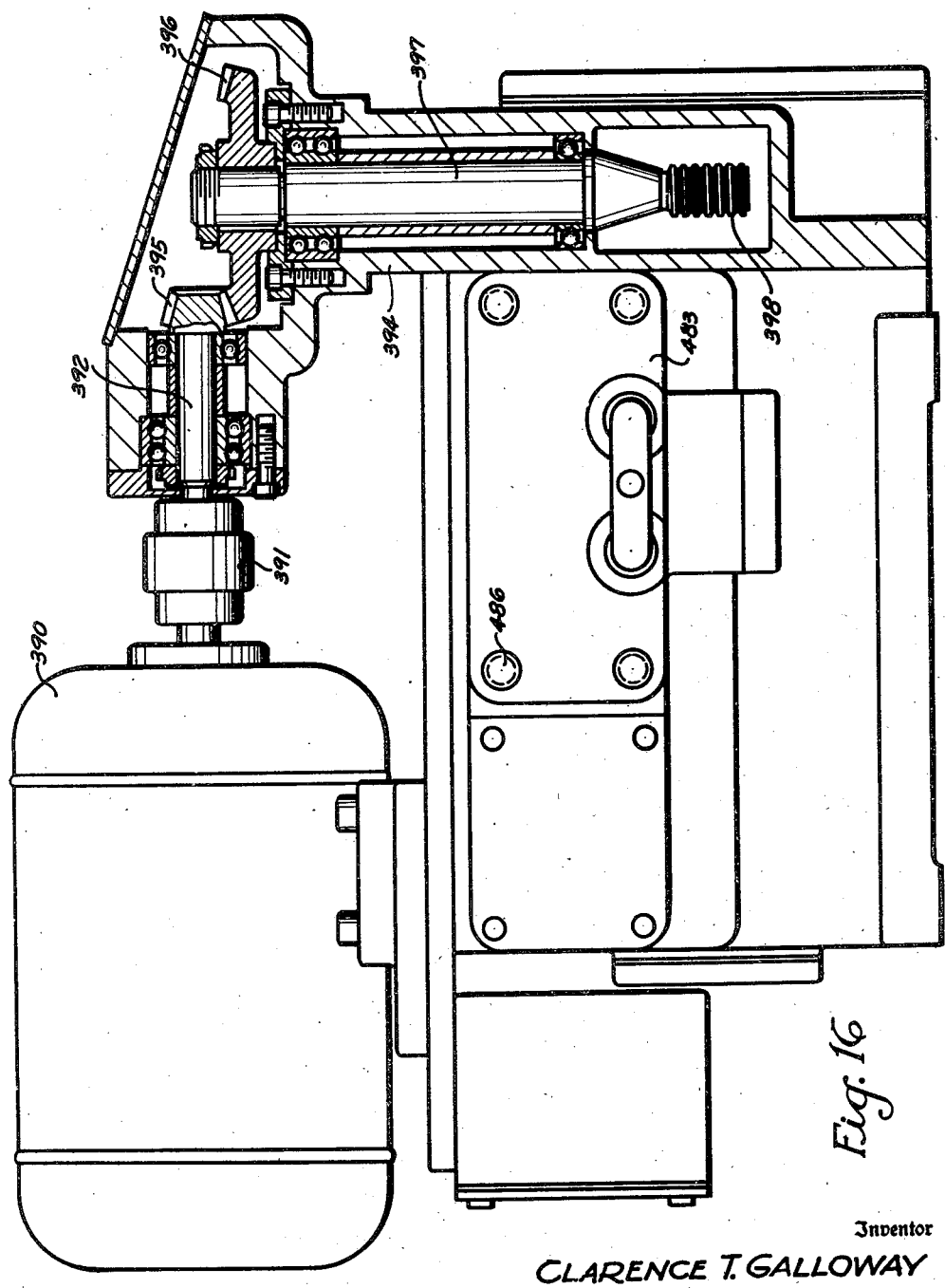
Fig. 16 is an enlarged side elevation of the motor and control block for the dressing cycle control mechanism, parts being broken away to show part of the drive to this mechanism.

The movement of the dressing mechanism into and out of operative position is controlled by a valve 431 (Figs. 17 and 26). This valve also controls the wheel feed mechanism, and the mechanism for swinging the wheel up to dressing position. This valve is mounted to reciprocate in a sleeve 480 that is secured in the casting 481. The casting 481 is bolted or otherwise secured to the housing 394. The valve 431 is constantly urged in one direction by a coil spring 482 which is interposed between one end of the valve and the cover-plate 483. The cover-plate is secured to the casting 481 by screws 486 (Fig. 16). The valve has a contact member 484 threaded into its opposite end which engages the back of a lever 433.

The movements of the support 444 for the side and end dressing tools is controlled by a valve 430, while between them, the valve 430 and the valve 431 control the movement of the end dresser to and from operative engagement with the grinding wheel. The valve 430 is mounted to reciprocate in a sleeve 490 which is secured in the casting 481. It is constantly urged in one direction by the coil-spring 492. This spring is interposed between one end of the valve and the cover-plate 483. The valve has a contact member 494 threaded into its opposite end which engages with the rear face of the lever 432.

The levers 432 and 433 (Fig. 17) are generally similar to the lever 411 (Fig. 18) and like that lever are journaled on the rod 412. The levers have hardened noses 496 and 497, respectively, formed on their front faces to engage the peripheries of the cams 401 and 402, respectively. Thus the cams 401 and 402 in their rotation control the movement of the dressing mechanism into and out of operative relation with the grinding wheel and the dressing operation itself.

In each dressing operation, each side dresser is first moved at a fast rate in one direction across a side surface of the wheel and then is returned across the same side surface at a somewhat slower rate. The rate of the slow return movement determines the fineness of finish dressed on the sides of the wheel in the dressing operation. As already stated, in the machine of the present invention, one or more rough-grinding operations may be performed on the work and then the work is finish-ground. The wheel must, of course, be dressed to a finer finish in order to finish-grind the work than for rough-grinding. In the machine of the present invention, it is preferred to employ for control of the rate of dressing the same type of mechanism, as is disclosed in my pending application above mentioned.

In this mechanism, there are two throttle valves used. These are adjustable independently of one another, and one of them controls the rate of return dressing movement of the side dressers in dressing the sides of wheel prior to a rough-grinding operation, while the other throttle valve controls the rate of return movement of the side dressers in dressing the sides of the wheel prior to the finish-grinding operation. A selector valve determines which of the two throttle valves is operable during a given dressing cycle.

The two throttle valves are denoted at 500 and 501, respectively, in Fig. 26, while the selector valve is designated 502. The throttle valves may be of standard construction and their openings may be adjusted by rotating the knurled micrometer dials 506 and 507, respectively (Fig. 17). The selector valve is reciprocable in a sleeve 503. It is constantly urged in one direction by a coil spring 504 and is moved in the opposite direction against the resistance of the spring by a solenoid 565 when that solenoid is energized, as will be described more particularly hereinafter.

The hydraulic pressure fluid is supplied to the various fluid-pressure operated parts of the machine from a pump 510 which is driven by a motor 509 (Figs. 26 and 27).

The various parts are shown in Fig. 26 in the positions they occupy when the sliding base is in its loading or fully withdrawn position. Here the pressure fluid flows from the pump 510 through the pressure line 511 into the chamber of a manually rotatable valve 512. This valve controls the chucking of the work and the movement of the sliding base from loading to operating position. It is of standard form and is so constructed that in one position of its rotation the ducts 516 and 71 will be on supply and the ducts 70 and 518 on exhaust, while in the other position of its rotation, ducts 70 and 518 will be on supply and lines 516 and 71 on exhaust.

The movement of the sliding base from operative to loading position is also controlled by a valve 520. This valve is of standard construction. It is reciprocable in a sleeve 521 that is secured in a casting 532 which is mounted at any suitable point on the machine. The valve is constantly urged in one direction by a coil spring 523 and is moved in the opposite direction by a solenoid 524, when that solenoid is energized. This solenoid is energized in each dressing cycle when the limit switch 416 (Figs. 17 and 27) is tripped, as has already been stated and as will be described more fully hereinafter.

In the positions of the parts shown in Fig. 26, the pressure fluid flows from the duct 511 into the duct 71 while the duct 70 is on exhaust through the duct 526 which is connected to the sump of the machine. Thus, the piston 78 is held in its forward position with the work dechucked. At this same time, the duct 516 is on supply and connects with the line 85, while duct 86 is on exhaust through ducts 518 and 526. Thus, the piston 80 and the sliding base 35 are held at loading position.

At this same time, also, the pressure fluid flows from the duct 511 through the duct 530, ports in the sleeve 490 of valve 430, and the duct 531 into the cylinder 471.

The fluid flowing out of the right hand end of the cylinder 471 passes through the duct 545 to the lower end of the piston 460, holding this piston at the upper limit of its movement in its cylinder. The fluid exhausting from the upper end of this cylinder flows through the duct 547, ports in the sleeve 490, duct 570, and ports in the sleeve 503 of valve 502 into a duct 571. Thence it flows through the throttle valve 500, duct 572, and ports of sleeve 490 into duct 538 which leads back to the sump of the machine. Thus, the tip dresser and side dressers are held at one limit of their swings.

At this same time the pressure fluid flows from the line 531 through the duct 532 into the block 474 to hold the shuttle valve 477 at one limit of its movement against the resistance of spring 539. This causes the shuttle valve to shut off flow of the pressure fluid from the duct 533 and it puts the duct 564, that leads to the left hand end of piston 473, on exhaust through the duct 567, which leads back to the sump of the machine. Thus, the tip dresser is held in its withdrawn position under actuation of spring 476.

At this same time the pressure fluid flows from the duct 530 through ports in the sleeve 490 of valve 430, duct 542, ports in sleeve 480 of valve 431, and duct 544 into the left hand end of the cylinder in which the piston 240 reciprocates. It also flows through the ducts 160 and 563 into the rotary cylinder 451, and through the duct 160 into the upper end of the cylinder 151. At the same time, the motive fluid exhausts from the lower end of cylinder 151 through the duct 161, from one side of piston 450 through duct 541, and from the right hand side of piston 240 through duct 540. The ducts 161, 541 and 540 all connect with a duct 535 which communicates through ports in the sleeve 480 of the valve 431 with a duct 537 which is connected with duct 572. This duct, as already described, connects through ports in the sleeve 490 of valve 430 with duct 538 that leads to the sump. Thus, the wheel advance mechanism is held in reset position, the wheel is held in its working position, and the dressing mechanism is held in inoperative withdrawn position.

At this same time, also, the pressure fluid flows from the pump 510 through the duct 550, ports in the sleeve 551 of a valve 552, a duct 553 drilled in a valve block 554, ports in the sleeve 555 of a valve 556, and the duct 558 into one end of the cylinder 286 (Figs. 10 and 26). The other end of this cylinder is at this time on exhaust through the duct 560, ports in the sleeve 555, and the duct 561 which leads back to the sump of the machine. Thus, the pawl 297 (Fig. 7) which is actuated by piston 285, is held in its reset position.

The valves 552 and 556 are of standard construction and are adapted to be actuated by solenoids 575 and 565, respectively, as will be described more particularly hereinafter. The valve block 554, in which these valves are mounted, may be mounted at any convenient point on the machine.

When the operator rotates the valve 512 from the position shown, the lines 70 and 518 are put on supply and the lines 71 and 516 on exhaust. This causes the work to be chucked and the sliding base 35 to be moved into operative position.

At the end of each grinding cycle, the solenoid 565 is energized in a manner which will be described further hereinafter and the valve 556 is shifted to cause the duct 560 to be put on supply and the duct 558 to be put on exhaust. This causes the piston 285 to move the pawl 297 (Figs. 7, 10, and 26) in such direction as to advance the cylinder 194 one step, causing the feed cam, which has previously been in engagement with the lever 211 (Figs. 4 and 6), to be shifted out of engagement and a new feed cam to be brought into operative position.

When the selector switch, which controls the operation of the machine between any particular grinding cycle, is so set that it calls for a dressing operation, then the motor 390 (Fig. 16) which drives the dressing cycle control mechanism is actuated. This causes the cams 401, 402, and 403 to be revolved.

As the cams rotate, the first operation is for the nose of lever 411 (Fig. 17) to ride up on the lobe 407 of cam 403 (Fig. 20) to break the circuit to solenoid 524 (Figs. 26 and 27) to deenergize this solenoid, permitting spring 523 to shift reverse valve 520 downwardly from the position shown in Fig. 26. This puts duct 85 on supply from duct 518 and it puts duct 86 on exhaust through ducts 575 and 516. This causes piston 80 to move back to the position shown in Fig. 26 to withdraw the work and sliding base from operative position. Then the nose 497 of lever 433 rides up on lobe 498 of cam 402 (Figs. 17 and 21)

and the valve 431 (Figs. 17 and 26) is shifted putting the duct 535 on supply and the duct 544 on exhaust. The pressure fluid flows from the duct 535 into the duct 540, shifting the piston 240 (Figs. 11, 12 and 26) to the left in its cylinder and causing the pawl 245 to actuate the ratchet wheel 243 to advance the grinding wheel. At the same time, the pressure fluid flows from the duct 535 into the duct 161, causing the piston 150 (Fig. 26) to be moved upwardly in its cylinder 151 to swing the grinding wheel up to dressing position. At the same time, also, the duct 541 is put on supply to cause the piston 450 (Fig. 26) to be rotated in its cylinder 451 to swing the dressing mechanism into operative position.

Then the nose 496 (Fig. 17) of lever 432 rides up on the lobe 499 (Fig. 22) of the cam 401 and the valve 430 (Figs. 17 and 26) is shifted, putting the duct 547 on supply and the duct 531 on exhaust. This causes the piston 460 (Fig. 26) to be forced downwardly in its cylinder, causing the dresser arms 440 and 441 to swing the side dressers in one direction across the sides of the grinding wheel. The motive fluid exhausting from the lower end of the piston 460 through the line 545 forces the piston 470 to the left in its cylinder 471, causing the tip dresser arm 443 to swing the tip dresser across the tip of the grinding wheel from one side to the other. At this time the tip dresser is held in engagement with the grinding wheel because with the line 531 on exhaust, the duct 532 is also on exhaust, and the shuttle valve 477 is forced to left from the position shown in Fig. 26 under actuation of the spring 539. The pressure fluid flowing through the duct 533 then enters the duct 564 in the block 474, causing the bracket 446 to be swung about its pivot 478 to hold the tip dresser in engagement with the wheel.

As the shaft 400 (Fig. 17) continues to rotate, the nose of the lever 432 rides down off of the lobe 499 of the cam 401 and the spring 492 shifts the valve 430 back to the position shown in Fig. 26. This again puts the ducts 531 and 544 on supply and the ducts 535 and 547 on exhaust. The pressure fluid now flows into the right hand end of the cylinder 471, forcing the piston 470 back to the right to impart the return swing movement to the tip dresser arm 443. The motive fluid is thus forced out of the right hand end of the cylinder 471 through the duct 545 into the lower end of the cylinder which houses the piston 460. This causes piston 460 to be moved upwardly to the position shown in Fig. 26 and the side dresser arms swing the side dressers back across the sides of the wheel. The motive fluid is forced out of the upper end of the cylinder, which houses the piston 460, through the duct 547, and through ports in the sleeve 490 of valve 430 into the line 570.

If the valve 502 is in the position shown in Fig. 26, it then flows from the duct 570 through ports in the sleeve 503 into the duct 571 and through the throttle valve 500 into the duct 572 and thence through ports in the sleeve 490 into the duct 538 which leads back to the sump. Thus, in this position of valve 502 the return stroke of the side dressers may be controlled by the setting of the throttle valve 500 which is intended to be adjusted so that the rate of the return stroke of the side dressers will rough-dress the wheel.

If the solenoid 505 has been energized, however, as is the case where finish dressing is to be done, then the valve 502 is shifted from the position shown in Fig. 26 and the motive fluid flows from the duct 570 through ports in the sleeve 503, the duct 574, the throttle valve 501, the ducts 536 and 537, and ports in the sleeve 490 into the duct 538 which leads back to the sump of the machine. In this case, then, the return stroke of the side dressers may be controlled by the setting of the throttle valve 501. This valve is intended to be adjusted so as to permit slow return strokes of the side dressers so that they may finish-dress the wheel.

At this time, the pressure fluid flowing through the line 532 forces the shuttle valve 477 to the right to the position shown in Fig. 26 against the resistance of the coil-spring 539. This causes the duct 564 to be connected with the duct 567 which leads back to the sump. Hence, the coil-spring 476 acting on the bracket 466 causes that bracket to be swung about its pivot to withdraw the tip dresser from dressing position. Hence, during the return swing of the end dresser arm 443, the tip dresser clears the wheel and does no dressing, as already stated.

In the further rotation of the shaft 400 (Fig. 17) the hardened nose 497 of the lever 433 rides down off of the lobe 498 (Fig. 21) of the cam 402 and the valve 431 returns to the position shown in Fig. 26 through operation of the spring 482. This causes the duct 544 to be put on supply from the duct 542, and the duct 535 to be put on exhaust through the ducts 536 and 537, ports in the sleeve 490, and the duct 538 which leads back to the sump. When the duct 544 is put on supply, the piston 240 is moved back to the right in its cylinder to the position shown in Fig. 26, resetting the pawl 245 of the wheel advance mechanism. At the same time the duct 160 is put on supply to force the piston 150 downwardly in its cylinder 151, causing the grinding wheel to be swung from dressing position back to operative position. At the same time, the duct 563 is put on supply, causing the piston 450 to be rotated in its cylinder back to the position shown in Fig. 26, to withdraw the dressing mechanism from dressing to inoperative position.

During the swing of side-dresser arm 440 (Fig. 26) in each direction, the limit switch 462 is opened to stop motor 390 (Figs. 17 and 27) but this limit switch is closed again at both end of the swing of this dresser arm as already described. Likewise, as already described, during swing of the dresser support 444 from inoperative to operative position and back, the motor 390 is stopped by opening limit switch 453, but this limit switch is closed when the dressing mechanism reaches operative position and again when it has returned to inoperative position, thus restarting motor 390.

As shaft 400 (Fig. 17) continues to rotate, the nose of lever 411 rides down off the lobe 407 of cam 403 (Fig. 20) to shift limit switch 416. This closes the circuit to solenoid 524 again, reenergizing this solenoid to cause it to return the valve 520 to the position shown in Fig. 26. This puts duct 86 on supply from duct 518 and it puts duct 85 on exhaust through duct 516. The piston 80 therefore moves to the left from the position shown in Fig. 26 to return the sliding base 35 and the work to operating position.

When the head 88 (Fig. 26) of piston-rod 87 moves away from limit switch 89 in the movement of the sliding base to withdrawn position, the limit switch opens, stopping motor 390, but when the head 88 contacts limit switch 90 at the end of the withdrawal movement, that limit switch is closed to restart the motor 390. Likewise, when the sliding base is returned to operating position, the head 88 moves away from limit switch 90 to allow this switch to open and stop motor 390, but when the sliding base reaches operating position again, head 88 closes limit switch 89 to restart motor 390 again. The four limit switches 89, 90, 453, and 462 permit of ample time for the hydraulically actuated parts to complete their movements while allowing all operations of the dressing cycle to be performed in a single revolution of shaft 400 and cams 401, 402, and 403.

As the shaft 400 rotates still further in the dressing cycle under actuation of motor 390, the nose of lever 425 rides up on the lobe 409 (Fig. 20) of cam 403 to close limit switch 426 (Figs. 17 and 27) to restart feed motor 110 (Figs. 25 and 27) starting a new grinding cycle.

Finally as the shaft 400 rotates still further, the nose of lever 422 rides up on the lobe 408 of cam 403 to open limit switch 423 (Figs. 17 and 27) to stop motor 390, ending the dressing cycle.

The operation of grinding the work proceeds in the manner described with all of the tooth spaces of the gear being ground step-by-step under control of the successive feed cams, with the feed cams being shifted successively into operating position between successive grinding cycles, and with the work being withdrawn and the wheel being swung up to dressing position and dressed in those periods between grinding cycles where the pre-setting of a selector switch predetermines that a dressing shall take place. After the last grinding cycle, that is, after the work has been finish-ground, the solenoids 312 and 575 (Figs. 26 and 27) are energized as will be described more fully hereinafter.

When the solenoid 312 is energized, the locking-dog 305 (Figs. 7 and 26) is withdrawn from engagement with the ratchet bar 298. At this same time the now-energized solenoid 575, causes the valve 552 (Fig. 26) to be moved upwardly in the sleeve 551. This puts the duct 580 on supply from the duct 550 through ports in the sleeve 551. The duct 580 is connected with the cylinder 190 (Figs. 6 and 26) in which the shaft 180 slides. The pressure fluid therefore causes the shaft 180 to be shifted axially back to its starting position.

The amount of its return movement is determined by the setting of a stop-bar 581 (Figs. 7 and 8). This stop-bar is slidable in a slot in the casting 287 and is manually adjustable therein. It has a projection 582 formed on one end that is adapted to engage a button 583 which is threaded into one end face of the cylinder 194. By adjusting the stop-bar 581, the operator can determine the number of grinding cycles which have to be completed before the work is done. The bar 581 is graduated, as shown in Fig. 7 for this purpose, and its graduations may be read against a suitable pointer (not shown). The bar is locked in position by a pin 585 which has a knurled knob 586 at one end and which is adapted to be engaged selectively in any one of a series of holes 587 in the bar 581. If the pin 585 is engaged in the hole corresponding to feed cam 184, for instance, then the return movement of the cylinder 194 is stopped when the feed cam 184 (Fig. 7) is in operative position. In this case, there will be only four grinds taken on the work, those being grinds controlled by the cams 184, 185, 186, and 187, respectively. If the pin is adjusted initially on the other hand however, to the hole corresponding to cam 187 then there will be seven grinds taken on the work before it is finished.

When the finish-grinding operation on the work has been completed, the operator can move the sliding base to loading position and dechuck and unclamp the work by rotating the valve 512 (Fig. 26) manually back to its starting position. This puts the ducts 71 and 516 back on supply and the ducts 70 and 518 back on exhaust. The job is done and he can now remove the completed gear and chuck a new workpiece.

One way in which the machine may be wired electrically to accomplish its purpose is illustrated diagrammatically in Fig. 27.

The four controllers for the different motors of the machine are shown at the top of the diagram at 605, 650, 670, and 685, respectively. Between the controllers 670 and 685 is the limit switch 334 which is provided to insure that the grinding wheel is in withdrawn position during dressing. Beneath the controllers are the several motors controlled thereby, namely, index and pump motors 352 and 509, wheel drive motor 100, feed drive motor 110 and dressing cycle drive motor 390. Beneath controller 670 is also the limit switch 426 which controls the starting of the feed motor after a dressing operation has been completed.

Reading down from the top of the diagram, the next important parts shown diagrammatically are the wheel motor stop and start buttons 643 and 641, respectively, and the feed motor stop and start buttons 747 and 745, respectively. In the next line is in the limit switch 335 which controls the resetting of the mechanism for advancing feed-cam shaft 180. Below this is the limit switch 170 which is operated by the mechanism for moving the grinding wheel from its working path to dressing position and back and which is one of the limit switches controlling the stopping and starting of the cycle motor. On a line with these switches 335 and 170 are the solenoid 312, which operates the lock-dog 305 (Fig. 7), and the solenoids 575 and 565 which control the directions of movement of the piston 285 (Figs. 26 and 10).

In the next line are the relays 695, 785, 655, 665, and 610. In the next line is the limit switch 416 which controls the movement of the sliding base, and below this is the solenoid 524 controlled by limit switch 416. Below the relays are four other relays 765, 690, 750, and 625, and the limit switch 761, 333, and 269. The limit switches 761 and 333 control the indexing of the work and the limit switch 269 controls wheel-wear. Between relays 765 and 690 is the solenoid 770, which trips the work-indexing mechanism, and between relays 750 and 625 is limit switch 89 which is operated by the movement of the sliding base and is one of the limit switches which control starting and stopping of the cycle motor 390 during the dressing cycle.

Below solenoid 524 is limit switch 754 which is tripped by the automatic stop mechanism and below relay 765 is the button 900 for restarting the dressing mechanism after a worn wheel has been replaced by a new wheel. In the next line are the selector switches 355, 356, 357, 358, 359, and 360. Below these are the several limit switches 362, 363, 364, 365, 366, 367, and 368 which cooperate with the selector switches to control the operations that take place between grinding cycles.

In the bottom line are the limit switches 90, 730, 453, 462, and 423. Limit switch 90 is operated by movement of the sliding base and is one of the limit switches which control starting and stopping of cycle motor 390 during the dressing cycle. Limit switch 730 is operated when the grinding wheel is moved from its working path to dressing position and back and also controls starting and stopping of cycle motor 390. Limit switches 453 and 462 are operated by movement of the dressor support 444 (Fig. 26) and by movement of dresser arm 440 (Fig. 26), respectively, and also control starting and stopping of cycle motor 390. Limit switch 423 is the limit switch which operates to finally stop cycle motor 390 on completion of a dressing operation.

The several relays 695, 785, 655, 665, 610, 765, 690, 750, and 625 may be of any standard or suitable construction. Likewise the several controllers 605, 650, 670, and 685 may be of any standard or suitable construction. The parts are shown in Fig. 27 in the positions they occupy when the sliding base 35 is in its loading or fully withdrawn position.

To start the machine, the operator must first throw in the main line switch (not shown). This energizes the coil 604 of the controller 605. The circuit to the coil 604 is from the main line $L_2$ through the line 606, the coil 604, the lines 607 and 608, the switch arm 609 of a standard relay 610, which is at this time closed, the lines 611, 612, 613, and 614 to the main line $L_1$. With the coil 604 energized the switch arms 615, 616, 617, and 618 of the controller 605 are closed thus making the circuits from the main line $L_1$, $L_2$, and $L_3$ to the two motors 352 and 509 and starting these motors.

At the time that the main line switch is closed, a circuit is also made to the coil 663 of the relay 665. This circuit is from the main line $L_1$ through the lines 614 and 666, the now-closed limit switch 334, the line 668, the switch arm 667 of controller 670, the line 672, the coil 663, the lines 669, 633, 634, and 635 to the main line $L_2$. The coil 663 is thus energized, closing the switch arms 674 and 675 of the relay 665. The limit switch 334 (Figs. 13, 14, and 27) is closed if, and as long as, the grinding wheel is in its withdrawn position.

As soon as the index motor 352 and hydraulic motor 509 have been started, the operator can start the motor 100, which drives the grinding wheel. This he does by pressing in the starter button 641. This closes a circuit from the main line $L_1$ through the lines 627 and 642, the stop button 643, the line 644, the starter button 641, the line 645, the coil 646 of controller 650, the line 647, the now-closed arm 618 of controller 605, the lines 648 and 649 the switch arm 651 of relay 655, the lines 633, 634, and 635 back to the main line $L_2$. This energizes the coil 646 of controller 650 and closes the switch arms 653, 654, 656, 657, and 658 of this controller, and starts motor 100. After the start button 641 is released this circuit is maintained from the main line $L_1$ through the lines 627 and 642, the stop button 643, the line 660, the switch arm 657 of controller 650, the line 661, the coil 646, the line 647, the switch arm 618 of controller 605, the line 648, the line 649, the switch arm 651 of controller 655, and the lines 652, 633, 634, and 635 to main line $L_2$. As long as the motor 100 runs, the wheel revolves, but it does not oscillate unless the feed motor 110 is running.

The operator now moves the control lever 590 (Figs. 1 and 2) to rotate the valve 512 (Fig. 26) and cause the sliding base 35 to be moved to operative position and the workpiece to be chucked. When the sliding base reaches operative position, the head 88 (Fig. 26) of the piston-rod 87 closes the normally open limit switch 89 (Figs. 26 and 27).

The machine illustrated in the drawings is so wired that the wheel is dressed before grinding actually begins. When the limit switch 89 is closed, it closes a circuit to the coil 621 of the relay 625, the circuit being from the main line $L_1$ through the lines 627, 628, and 629, the limit switch 89, the line 630, the coil 621, the lines 632, 633, 634, and 635 to the main line $L_2$. As soon as the coil 621 is energized, the switch arms 637 and 638 of the relay 625 are closed.

When the limit switch 89 is closed, a circuit is also made to the coil 681 of the controller 685. This circuit is from the main line $L_2$ through the lines 635, 634, 633, and 682, the now-closed switch arm 658 of controller 650, the lines 683 and 684, the coil 681, the line 686, the switch arm 687 of relay 690, the lines 688 and 689, the now-closed switch arm 674, the line 691, the switch arm 692 of relay 695, the line 694, the now-closed switch arm 638 of relay 625, the lines 696 and 697, the limit switch 462 (Figs. 26 and 27), which is held closed at this time by dresser arm 440, the line 699, the limit switch 453, which is held closed at this time by piston 450 (Figs. 26 and 27) the lines 701 and 702, the switch arm 704 of relay 610, the lines 705 and 709, the now-closed switch arm 637 of relay 625, the lines 710 and 627 to the main line $L_1$. The limit switch 90 is a normally open limit switch and opens as soon as the sliding base starts to move to operative position carrying the head 88 (Fig. 26) of piston-rod 87 away from it. The limit switch 453 is held closed because the bracket 444 (Fig. 26), which carries the dresser mechanism, is in its out position, while the limit switch 462 is held closed by the dresser arm 440 (Fig. 26) in the starting position of this arm.

With the coil 681 energized, the switch arms 711, 712, and 713 of the controller 685 are closed, making a circuit to the dressing cycle motor 390 (Figs. 16 and 27) from the main lines $L_1$, $L_2$, and $L_3$, and starting this motor.

As soon as the dressing cycle motor 390 starts, it starts to rotate the cam shaft 400 (Fig. 17). This causes the nose 410 (Fig. 18) of lever 411 to ride up on the lobe 407 (Fig. 20) of cam 403, opening the limit switch 416. This breaks the circuit to the solenoid 524 (Figs. 26 and 27) de-energizing this solenoid. This permits spring 523 to the reverse valve 520 causing the sliding base to move back from operative to loading position. When this occurs, the head 88 (Fig. 26) of rod 87 moves away from the limit switch 89, which is a normally open limit switch, and this limit switch opens, breaking the circuit to the coil 681 and to the cycle motor 390. The sliding base 35 continues to move on out, however, to loading position because the pump motor 509 continues to run and supply the pressure fluid to the piston 86 (Fig. 26).

When the sliding base 35 reaches loading position again, the limit switch 90, which is also a normally open switch, is closed. This restarts the cycle motor 390, for in the slight movement of the shaft 400 (Fig. 17) on the initial start of the cycle motor above described, the plunger 424 (Fig. 17) will have ridden down off of the lobe 408 of cam 403 (Fig. 20) and the limit switch 423 will have been closed. The circuit to the coil 681 of the controller 685 is made at this time from the main line $L_2$ through the lines 635, 634, 633, and 682, the switch arm 658 of controller 650, the lines 683 and 684, the coil 681, the line 686, the switch arm 687 of relay 690, the line 688, the now-closed limit switch 423, the line 697, the limit switch 462, the line 699, the limit switch 453, the line 701, the line 702, the switch arm 704 of the relay 610, the lines 705 and 706, the low-closed limit switch 90, and the line 627 to the main line L₁.

The shaft 400 again starts to rotate, therefore, under actuation of the cycle motor 390. As this shaft revolves, the nose 497 (Fig. 17) of lever 433 rides up on the lobe 498 (Fig. 21) of cam 402. The valve 431 (Figs. 17 and 26), is, therefore, shifted from the position shown in Fig. 26. The grinding wheel, therefore, begins to swing upward to dressing position under actuation of piston 150, the dresser bracket 414 begins to move into dressing position, under actuation of piston 450, and the wheel is advanced by pawl 245 (Figs. 11, 12, and 26) under actuation of piston 240.

As the piston 150 moves upwardly, swinging the grinding wheel to dressing position, the limit switch 170 (Figs. 26 and 27) is allowed to shift from the position shown in Fig. 27 to a position connecting lines 881 and 729. As the dresser bracket 441 swings inwardly, the limit switch 453 (Figs. 26 and 27) is also opened. When either of these limit switches opens, the circuit to the coil 681 of the controller 685 is broken and the cycle motor 390 is again stopped. The opening of the limit switch 453 directly breaks this circuit, while the shifting of the limit switch 170 breaks the circuit to the coil 776 of the relay 610 and makes a circuit to the coil 776 of relay 695. The circuit is made to coil 776 from the main line L₁ through the lines 627, 728, 729, the limit switch 170, the lines 778 and 779, the coil 776, and the lines 780, 633, 634, and 635 to the main line L₂. This energizes the coil 776 causing the switch arms 692 and 782 of relay 695 to be pulled out of contact and the switch arms 783 and 784 to be pulled in.

The stoppage of the cycle motor 390 does not affect the movement of the piston 150 or of the piston 450 for these are hydraulically actuated and the wheel swings on up to dressing position and the dressing mechanism moves on in to dressing position.

When the wheel has been swung up to dressing position, the limit switch 730 is closed. This limit switch is a normally open limit switch and is positioned at a suitable point on the upright 31 to be closed by a lug 731 on segment 142 (Figs. 4 and 6) when the quill 96 has been swung far enough to move the wheel to dressing position. When the bracket 444 (Fig. 26) has swung into dressing position, the limit switch 453 is closed again. A circuit is therefore again made to the coil 681 of the controller 685 from the main line L₂ through the lines 635, 634, 633, and 682, the switch arm 658 of the controller 650, the lines 683 and 684, the coil 681, the line 686, the switch arm 687 of relay 690, the line 688, the now-closed limit switch 423, the line 697, the limit switch 462, the line 699, the now-closed limit switch 453, the line 701, the now-closed limit switch 730, the line 706, the now-closed limit switch 90, and the line 627 to the main line L₁. This restarts the cycle motor 390 to rotate the cam shaft 400 further on. This causes the nose 496 (Fig. 17) of lever 432 to ride up on the lobe 499 (Fig. 22) of the cam 401 to shift the valve 430 (Fig. 17). The dresser arms 440, 441, and 443 (Fig. 2) are thus actuated to swing in one direction across the side and tip surfaces of the grinding wheel to dress the wheel.

As the dresser arms start to swing, the plunger 463 (Fig. 26) rides on the periphery of dresser arm 440 and the limit switch 462 is opened, thus breaking the circuit to the cycle motor 390 and again stopping this motor. The dresser arms, however, complete their swings across the side and tip surfaces of the wheel in one direction because they are fluid-pressure actuated.

The limit switch 462 is again closed at the end of the swing of the dresser arms when the plunger 463 drops again into a recess 466 of dresser arm 440. This causes the circuit to the coil 681 of controller 685 to be made again, and the cycle motor 390 is restarted. This time it rotates the cam shaft 400 (Fig. 17) far enough for the nose 496 of lever 432 to ride down off the lobe 499 of cam 401 (Fig. 22). This allows spring 492 (Figs. 17 and 26) to reverse the valve 430. The dresser arms 440, 441, and 443 then swing in their return strokes. In the return stroke of the end dresser arm 443, the piston 473 (Fig. 26) is put on exhaust, causing the tip dresser to clear the wheel, as already described, so that it does not dress on its return stroke. Again as the dresser arm 440 swings, the plunger 463 (Fig. 26) rides on the periphery of arm 440, and the limit switch 462 is opened and again, therefore, the cycle motor is stopped until the return strokes of the arms have been completed.

The rate of return swing of the dressers is controlled, as already described, by one or other of the throttle valves 500 or 501. The limit switch 462 permits of any rate of return swing to be selected, for the cycle motor 390 is stopped and shaft 400 is stationary until the return swing is completed, no matter how long that return swing may be.

The cycle motor remains stopped until the plunger 463 again drops into a notch 466 of arm 440. Then limit switch 462 is again closed to restart the cycle motor 390. The cam shaft 400 then rotates on further, causing the nose 497 of lever 433 (Fig. 17) to ride down off the lobe 498 of cam 402 (Fig. 21). This allows spring 482 (Figs. 17 and 26) to reverse the valve 431. This causes the dresser bracket 444 (Figs. 2 and 26) to swing out under actuation of rotary piston 450, and the quill 96 (Fig. 4) to swing down under actuation of piston 150 (Fig. 26) to return the grinding wheel to grinding position. At the same time, also, the piston 240 (Figs. 11, 12, and 26) returns to reset the wheel-advancing mechanism.

As the wheel swings down to grinding position, the limit switch 730 is allowed to open, and as the dresser bracket 444 swings out, the plunger 454 (Fig. 26) rides on the periphery of piston 450 and the limit switch 453 is opened. The opening of either limit switch again stops the cycle motor 390.

When the piston 50 has returned to the position shown in Fig. 26 with the wheel back in grinding position, the limit switch 170 is shifted back to the position shown in Fig. 27 to reenergize the coil 726 of the relay 610, thus causing the switch arms 735, 704, and 609 of this relay to be closed. When the bracket piston 450 has swung the bracket 444 out to inoperative position, the limit switch 453 is also reclosed. Thus, the circuit to the coil 681 is again made and the cycle motor 390 is restarted. The shaft 400 again starts, therefore, to rotate. The nose 410 (Fig. 18) of lever 411 rides down now off of the lobe 497 of cam 403 (Fig. 20) and the limit switch 416 is shifted back to the position shown in Fig. 27. This makes a circuit to the solenoid 524 (Fig. 26). This circuit is from the main line L1 through the lines 627 and 717, the limit switch 416, the line 718, the solenoid 524, the lines 719, 720, 633, 634, and 635 to main line L2. It also makes a circuit to the coil 721 of relay 750, closing the switch arm 749 of this relay, the circuit being from the main line L1 through lines 627 and 717, limit switch 416, line 722, coil 721, and lines 723, 633, 634, and 635 to main line L2.

The circuit through solenoid 524 reenergizes that solenoid, shifting the valve 520 back to the position shown in Fig. 26. The sliding base 35 accordingly is moved back into operating position.

As the sliding base moves inwardly, the head 88 of piston-rod 87 releases the normally-open limit switch 90 and the circuit to the cycle motor 390 is again broken. When the sliding base has returned to operating position, however, the normally-open limit switch 89 is closed and a circuit is made to the coil 621 of relay 625. As already described, this closes a circuit to coil 681 of controller 685 and the cycle motor 390 is restarted.

As the cam shaft 400 revolves further on, the nose of lever 425 (Fig. 17) rides up on the lobe 409 of cam 403 (Fig. 20) to close the normally-open limit switch 426. This makes a circuit to the coil 741 of the controller 670. This circuit is from the main line L2 through the lines 635, 634, 633, and 682, the switch arm 658 of the controller 650, the line 683, the coil 741, the lines 742 and 743, the now-closed limit switch 426, the lines 744 and 746, the stop button 747, the line 748, the switch arm 749 of relay 750, the line 751, the arm 735 of relay 610, the lines 752 and 753, the limit switch 754, which is incorporated in the automatic stop mechanism 350 (Figs. 1 and 2), the line 755, and the line 627 to the main line L1.

When the coil 741 is thus energized, it closes the arms 831, 832, 833, and 834 of controller 670, starting feed motor 110. As soon as the nose of lever 425 (Fig. 17) rides down off of the lobe 409 of cam 403 (Fig. 20), the limit switch 426 reopens, but the circuit to coil 741 is maintained and feed motor 110 continues to run. The hold-in circuit to coil 741 is from main line L2 through the lines 635, 634, 633, and 682, the switch arm 658 of controller 650, the line 683, the coil 741, the line 835, the switch arm 834 of controller 670, the line 830, the stop button 747, the line 748, the switch arm 749 of relay 750, the line 751, the arm 735 of relay 610, the line 752, the line 753, the limit switch 754, the line 755, and the line 627 to the main line L1.

The cycle motor 390 continues to run and the cam shaft 400 continues to rotate until the nose of lever 422 (Fig. 17) rides up on the lobe 408 (Fig. 20) of cam 403 reopening limit switch 423. This will break the circuit to the coil 681 and stop the cycle motor 390 finally. The dressing cycle is now complete. The sliding base is back in operative position, and the feed motor is runnig to feed the wheel into the work.

As the feed motor 110 revolves, it drives the gear 345 (Figs. 13 and 14) and the cams 320 and 328, which are secured thereto, through the gearing already described (Fig. 25). As the gear 345 starts to rotate, the nose of lever 323 rides down off the lobe 326 (Figs. 13, 14, and 24) of cam 320, allowing limit switch 334 to open.

In the further rotation of gear 345, the lever 322 is tripped by the pin 321 (Fig. 24) on cam 320 and the limit switch 333 is closed. This causes the work to be indexed. The work is indexed before a tooth space has been ground in order to take up any backlash in the gear train, eliminate the effect of oil film in the bearings, etc. When the limit switch is closed a circuit is closed from the main line L1 through the line 614, the line 613, the now-closed limit switch 761, the line 762, the now-closed limit switch 333, the line 763, the coil 764 of the relay 765, the line 719, the line 720, and the lines 633, 634, and 635 to the main line L2. Thus the coil 764 of the relay 765 is energized and the switch arms 768 and 769 of this relay are closed. This causes the solenoid 770 to be energized, the circuit to the solenoid being made from the main line L1 through the lines 627, 628, 629, and 771, the switch arm 769 of relay 765, the line 772, the solenoid 770, the lines 773, 633, 634, and 635 to the main line L2. The solenoid 770 trips the index mechanism of the machine, as already described and the work is indexed.

In the further rotation of the gear 345 (Figs. 13 and 14) the lever 324 rides up on the lobe 327 (Fig. 23) of cam 328, and the limit switch 335 is closed. This makes a circuit to the coil 776 of the relay 695, the circuit being made from the main line L1 through the lines 627 and 777, the now-closed limit switch 335, the lines 778 and 779, the coil 776, the lines 780, 633, 634, and 635 to the main line L2. When the coil 776 is energized, the switch arms 692 and 782 of the relay 695 are opened and the switch arms 783 and 784 of this relay are closed. This also causes the coil 786 of the relay 785 to be energized, the circuit to this coil being made from the main line L2 through the lines 635, 634, 633, and 787, the coil 786, the line 788, switch arm 789 of relay 655, the lines 790 and 791, the now-closed switch arm 784 of relay 695, the line 778, the limit switch 335, and the lines 777 and 627 to the main line L1.

The energizing of the coil 786 closes the switch arms 793 and 794 of the relay 785 and opens switch arm 796 of this relay. The closing of the limit switch 335 therefore causes the solenoid 565 (Figs. 26 and 27) to be deenergized because the circuit to this solenoid is broken when the switch arm 782 of the relay 695 is opened. This causes the valve 556 (Fig. 26) to be returned to the position shown in Fig. 26, with the result that the piston 285 (Figs. 26 and 10) and pawl 297 are moved to their reset positions.

While the gear 345 and cams 320 and 328 (Figs. 23 and 24) are revolving, the feed cam shaft 180 (Figs. 4, 6, and 25) is also revolving, causing the rotating and oscillating grinding wheel to be alternately fed into the work and withdrawn. The wheel will be in fully withdrawn position when the cam 320 will have rotated far enough on each revolution of cam 320 for lobe 326 to reclose limit switch 334. On each revolution of cam 320 the pin 321 will trip the index mechanism, to index the work. Then the feed of the wheel into the work will begin anew. In each revolution of cam 328, the lobe 327 of this cam (Fig. 23) will rock lever 324 but since the pawl 297 (Fig. 7) has been reset and is not advanced until the end of a grinding cycle, the rocking of lever 324 is simply an idle movement. On each revolution of gear 345, the cam 347 (Fig. 13) will advance the automatic stop 350 (Figs. 1 and 2) in the conventional manner.

The machine thus goes through a grinding cycle, with the wheel being fed into the work to grind a tooth surface or tooth space, and the wheel being withdrawn to index the work, until a grind has been effected in each tooth space of the work. Then the automatic stop 350 trips and the limit switch 754, which forms part of the automatic stop, is shifted from the position shown in Fig. 27 to a position where it connects lines 802 and 803. This causes the coil 801 of the relay 695 to be energized, closing the switch arms 692 and 782 of this relay again and opening the switch arms 783 and 784. The circuit to the coil 801 is made from the main line $L_1$ through the lines 627, 755, and 802, the limit switch 754, the line 803, the coil 801, and the lines 808, 633, 634, and 635 to the main line $L_2$. This causes the solenoid 565 (Figs. 26 and 27) to be energized, the circuit to this solenoid being made from the main line $L_1$ through the line 627, the line 804, the switch arm 782, the line 805, the line 806, the switch arm 793, the line 809, the solenoid 565, the line 807, and the lines 682, 633, 634, and 635 to the main line $L_2$. This causes the valve 556 (Fig. 26) to be shifted causing the piston 285 (Figs. 10 and 26) to move on its operative stroke.

The automatic stop 350 is constructed, as previously stated, according to conventional form, and the automatic stop switch 754 returns to the position shown in Fig. 26 immediately after tripping.

As the piston 285 moves, the bottom wall 317 (Fig. 7) of the cam slot 315 causes the lock dog 305 to be disengaged from ratchet bar 299 and immediately thereafter the pawl 297 drops into engagement with one of the notches in the ratchet bar, so that, in the further movement of the piston 285, the feed cam shaft is moved bodily axially to move the feed cam, which has previously been in operative position, out of operative position, and bring a new feed cam into operative position.

As the feed cam shaft is shifted, the button 370 (Fig. 9) carried by the cylinder 194 (Fig. 7) is disengaged from the head of plunger 372 and moved into engagement with the head of plunger 373. This allows the normally-closed limit switch 362 to close and causes the limit switch 363 to be shifted from the position shown in Fig. 27 to a position where it connects the lines 844 and 812.

What occurs next will depend upon the setting of the selector switch which controls that particular interval between grinding cycles. For the purpose of this description, it will be assumed that there are seven grinds to be taken on the work, and that, therefore, the feed cam 181 controls the grinding operation during the first grinding operation, while the selector switch 355 controls what takes place in the first interval between grinding cycles.

If the selector switch 355 (Figs. 1 and 27) is in the "grind" position, connecting the lines 810 and 811, then, when the automatic stop limit switch 754 opens at the end of the first grinding cycle, the circuit to the feed motor 110 is not broken. This circuit is maintained instead through the selector switch 355, the circuit being from the main line $L_1$ through the lines 627 and 810, the selector switch 355, the lines 811, 814, and 815, the limit switch 363, the line 817, the limit switch 364, the line 819, the limit switch 365, the line 821, the limit switch 366, the line 823, the limit switch 367, the line 825, the limit switch 368, the line 752, the switch arm 735 of relay 610, the line 751, the switch arm 749 of relay 750, the line 748, stop button 747, the line 830, the now-closed switch arm 834 of the controller 670, the line 835, the coil 741 of controller 670, the line 683, the switch arm 658 of controller 650, the lines 682, 633, 634, and 635 to the main line $L_2$.

The feed motor 110 continues running, therefore, and since the coil 741 remains energized, no circuit can be formed to the coil 681 of the controller 685. Thus the dressing cycle motor 390 can not start. Under these circumstances, all that happens in the interval between grinding cycles is the shift of the feed cams. The grinding wheel is fed immediately thereafter back into the work to grind each tooth space of the work a second time under control of the newly-positioned feed cam 182.

If the selector switch 355 is on the other hand in either "rough-dress" position (shown in dotted lines) or "finish-dress" position, then, when the automatic stop limit switch 754 is shifted at the end of the grinding cycle, the hold-in circuit to the coil 741 of the controller 670 is broken and the feed motor stops. At the same time the cycle motor 390 is started for, when the circuit to the coil 741 is broken, the switch arm 667 drops to the position shown in Fig. 27 to make a circuit to the coil 663 of relay 665, and when the limit switch 754 connects lines 755 and 803 it energizes coil 801 of relay 695. When coil 663 of relay 665 is energized, the switch arm 674 of this relay is closed while when coil 801 is energized it closes arms 692 and 782 of relay 695. Thus a circuit is reestablished to the coil 681 of controller 685, the circuit being made as above described and extending from line $L_2$ through lines 635, 634, 633, and 682, switch arm 658 of controller 650, lines 683 and 684, coil 681, line 686, switch arm 687 of relay 690, lines 688 and 689, the now-closed switch arm 674 of relay 665, line 691, the now-closed switch arm 692 of relay 695, line 694, switch arm 638 of relay 625 which is at this time closed, lines 696 and 697, limit switch 462, line 699, limit switch 453, lines 701 and 702, switch arm 704 of relay 610, lines 705 and 709, switch arm 637 of relay 625 which is at this time closed, lines 710 and 627 to main line $L_1$. The stop switch 754 returns immediately to the position shown in Fig. 27 but the circuit to the coil 681 having been made is maintained and the motor 390 starts to drive shaft 400. From this point on the dressing cycle is exactly as first described, if the wheel is to be rough-dressed.

The only difference between the rough-dressing cycle and the finish dressing cycle is that if the selector switch is in finish-grinding position it connects the lines 812 and 813. Then when the feed cam shaft 180 is shifted, the solenoid 505 (Figs. 26 and 27) is energized. The circuit to this solenoid is from the main line $L_1$ through the lines 627 and 841, the now-closed limit switch 362, the line 815, the line 844, the limit switch 363, which now connects lines 844 and 812, the line 812, the selector switch 355, the line 813, the solenoid 505, and the lines 634 and 635 to the main line $L_2$. The limit switch 362 is closed when the feed cam shaft 180 is shifted axially and the limit switch 363 is shifted by button 370 (Fig. 9) of cylinder 194, as already described. The energizing of the coil 505 causes the dresser selector valve 502 (Fig. 26) to be shifted from the position shown in Fig. 26 and the result is that the wheel is finish dressed under control of throttle valve 501 as already described.

At the end of the dressing operation, the dressing mechanism is swung out to inoperative position, the grinding wheel is swung down to grinding position, the wheel-advance mechanism is reset, the sliding base is returned to operative position, the feed motor is started, and the cycle motor is stopped, exactly as described above. Then the second grinding cycle on the work begins.

At the end of the second grinding cycle, the automatic stop 350 again trips, the feed cam shaft is shifted axially again, and either the wheel is dressed or the grinding operation proceeds, depending upon the setting of the selector switch 356 as at the end of the first grinding cycle. If the selector switch 356 is in the "grind" position shown in Fig. 27 connecting the lines 811 and 847, then the cycle motor 390 does not start, but the feed operation continues and a new grind takes place, the circuit to the feed motor being maintained, despite the opening of the automatic stop, from the main line $L_1$ through the lines 627 and 841, the now-closed limit switch 362, the line 815, the line 814, the line 811, the selector switch 356, the lines 847, 848, and 817 and from the line 817 to the main line $L_2$ in the same manner as described before. If the selector switch 356 is in one of the two dressing positions, however, the cycle motor 390 is started, as before, and the wheel is dressed. The shift of the cam shaft 180 causes button 370 (Fig. 9) to shift switch 364 and allow switch 363 to return to the position shown in Fig. 27. Hence if the selector button 356 is in a "dress" position, a circuit is made to coil 681 of cycle motor controller 685. If the selector switch is in "rough-dress" position, the circuit is the same as described for the first dressing cycle. If the selector switch is in "finish-dress" position, the solenoid 505 is energized also to shift selector valve 502 (Fig. 26) so that when the wheel is dressed it is finish-dressed. The circuit to this solenoid is from main line $L_1$ through the lines 627 and 841, now-closed limit switch 362, line 815, now-closed limit switch 363, line 817, limit switch 364, which now connects lines 867 and 850, line 850, selector switch 356, the line 851, the line 813 and thence to main line $L_2$ as described in connection with operation of selector switch 355.

So the operation of the machine continues, each tooth of the work is ground and after each tooth has been ground, the work is indexed, and after all of the teeth have been ground in a grinding cycle the automatic stop switch 754 trips, and then the feed cam shaft 180 is shifted. Then either a new feed cycle begins or the work is withdrawn and the wheel dressed depending upon the position of the selector switch for that interval. It will be obvious that the lines 850, 852, 853, 854, 855, 856, 857, 858, 859, 860, 861, 862, 863, 864, and 865 enable the desired circuits to be maintained in any positions of the selector switches. The "grind" positions of the several selector switches 355, 356, 357, 358, 359, and 360 are shown in full lines while the "rough-dress" positions are shown in dotted lines.

When the last feed cam 187 is indexed to operating position, the limit switch 368 is shifted by button 370 (Fig. 9) so that it connects lines 871 and 873 instead of lines 825 and 752. This makes a circuit to the coil 872 of the relay 655. This circuit is from the main line $L_1$ through the lines 627 and 841, the now-closed limit switch 362, the line 815, the limit switch 363, the line 817, the limit switch 364, the line 819, the limit switch 365, the line 821, the limit switch 366, the line 823, the limit switch 367, the lines 825 and 871, the now-shifted limit switch 368, the line 873, the coil 872 of relay 655, and the lines 874, 633, 634, and 635 to the main line $L_2$. This causes the coil 872 to be energized, causing the switch arm 875 to be closed and the switch arms 789 and 651 of relay 655 to be opened.

The opening of the switch arm 789 breaks the circuit to the coil 786 of relay 785. The opening of the switch arm 651 breaks the circuit to the coil 646 of the controller 650 through that arm, although this circuit may be maintained as long as either the switch arm 794 of relay 785 is connecting the lines 806 and 877 or the switch arm 783 of relay 695 maintains connection between the lines 649 and 879.

When the lug 327 of cam 328 (Figs. 14 and 23) trips the limit switch 335, however, during finish-grinding of the first tooth space of the work, the coil 880 of relay 875 is energized, opening the switch arm 794. The circuit to the coil 880 is from the main line $L_2$ through the lines 635, 634, 633, and 883, the coil 880, the line 882, the now-closed switch arm 875 of relay 655, the line 791, the now-closed switch arm 784 of relay 695, the line 778, the now-closed limit switch 335, the lines 777 and 627 to the main line $L_1$. When the automatic stop 350 trips, then, after the finish grinding operation has been performed on the last tooth space of the work, the stop switch 754 makes a circuit to the coil 801 of the relay 695 from main line $L_1$ through lines 627 and 755, switch 754, line 803, coil 801, and lines 808, 633, 634, and 635 to main line $L_2$. This closes switch arms 692 and 782 but opens the switch arms 783 and 784, breaking the circuit to the coil 646 of controller 650. This stops the wheel motor 100. The feed motor 110 itself is stopped by the tripping of the automatic stop.

At the same time that this is occurring, a circuit is made to the solenoids 312 and 575 (Figs. 26 and 27). The circuit to these solenoids is from the main line $L_2$ through the lines 635, 634, 633, 682, and 807, the two solenoids 312 and 575, the line 893, the switch arm 796 of the relay 785, the line 805, the switch arm 782 of the relay 695, the lines 804 and 627 to the main line $L_1$. The solenoids 575 and 312 are, therefore, energized causing the valve 552 (Fig. 26) to be shifted and the lock-dog 305 (Figs. 26 and 7) to be disengaged. The release of lock-dog 305 allows feed cam shaft 180 to be moved axially and the shifting of valve 552 allows pressure to be applied to the feed cam shaft 180 through duct 580 (Figs. 6 and 26) causing the feed cam shaft to be returned to initial position with cam 181 in position ready to grind another gear. The operation of the machine has been completed. The operator now moves handle 590 (Figs. 1 and 2) to rotate valve 512 (Fig. 26) to put duct 71 on supply and duct 70 on exhaust and duct 85 on supply from duct 516 and duct 86 on exhaust through duct 518. Thus, the sliding base 35 is moved to loading position and the work dechucked.

To guard against the wheel being used after it is worn out, the limit switch 269 (Figs. 5 and 27) is provided as already described. This limit switch is closed when the wheel has been fed forward to its extreme limit and is worn down to an extent to be no longer usable. When this limit switch is closed, a circuit is made from the main line $L_2$ through the lines 635, 634, 633, and 896, the coil 897 of relay 690, the line 898, the limit switch 269, the lines 899, 613, and 614 to the main line $L_1$. This causes the coil 897 of the relay 690 to be energized, opening the switch arm 687 of this relay and breaking the circuit to the coil 681 of the controller 685, preventing the starting of the cycle motor 390. This, of course, stops the machine since the wheel advance movement occurs always at the beginning of a dressing cycle when the feed motor is already stopped.

The wheel cannot be dressed further. Therefore, a new wheel must be placed on the machine. When this has been done, of course, the wheel-advancing mechanism is adjusted back to initial position. When the operator wishes to restart the machine he then pushes in the restart button 900. This makes a circuit from main line $L_1$ through lines 627 and 628, button 900, line 901, coil 902 of relay 690, lines 903, 633, 634, and 635 to main line $L_2$. This energizes coil 902, causing switch arm 687 to be closed, reestablishing the circuit to coil 681 of controller 685, enabling cycle motor 390 to restart, and allowing the machine to resume its functions.

For emergency stopping of wheel motor 100, the stop button 643 is provided and for emergency stopping of feed motor 110 stop button 747 is provided. These motors can be restarted by start buttons 641 and 745, respectively.

Summary of operation

The operation of the machine will be understood from the preceding description but may briefly be summed up here.

Before starting the machine, the operator, of course, makes all the necessary adjustments. The stop bar 581 (Fig. 7) is adjusted to control the number of grinds to be taken on the work. The several selector switches of the group 355 to 360 inclusive (Figs. 1 and 27), which correspond to the grinds to be taken in the work are all also adjusted to predetermine what is to occur in intervals between grinding cycles, that is, whether the feed cam shaft 180 is simply to be shifted a step axially or whether in addition, the wheel is to be dressed, and, if it is to be dressed, whether it is to be rough-dressed or finish-dressed. The work support is also adjusted in accordance with the hand of spiral which it is desired to produce on the work. In the position shown in Fig. 2 a gear G will be ground having teeth of left-hand spiral curvature. If it is desired to grind a right-hand spiral gear, the table 40 is adjusted angularly on slide 36 to the opposite angle and slide 36 is adjusted laterally on sliding base 35. The amount of spiral angle of the teeth is controlled by vertical adjustment of workhead 55.

Figure 4:
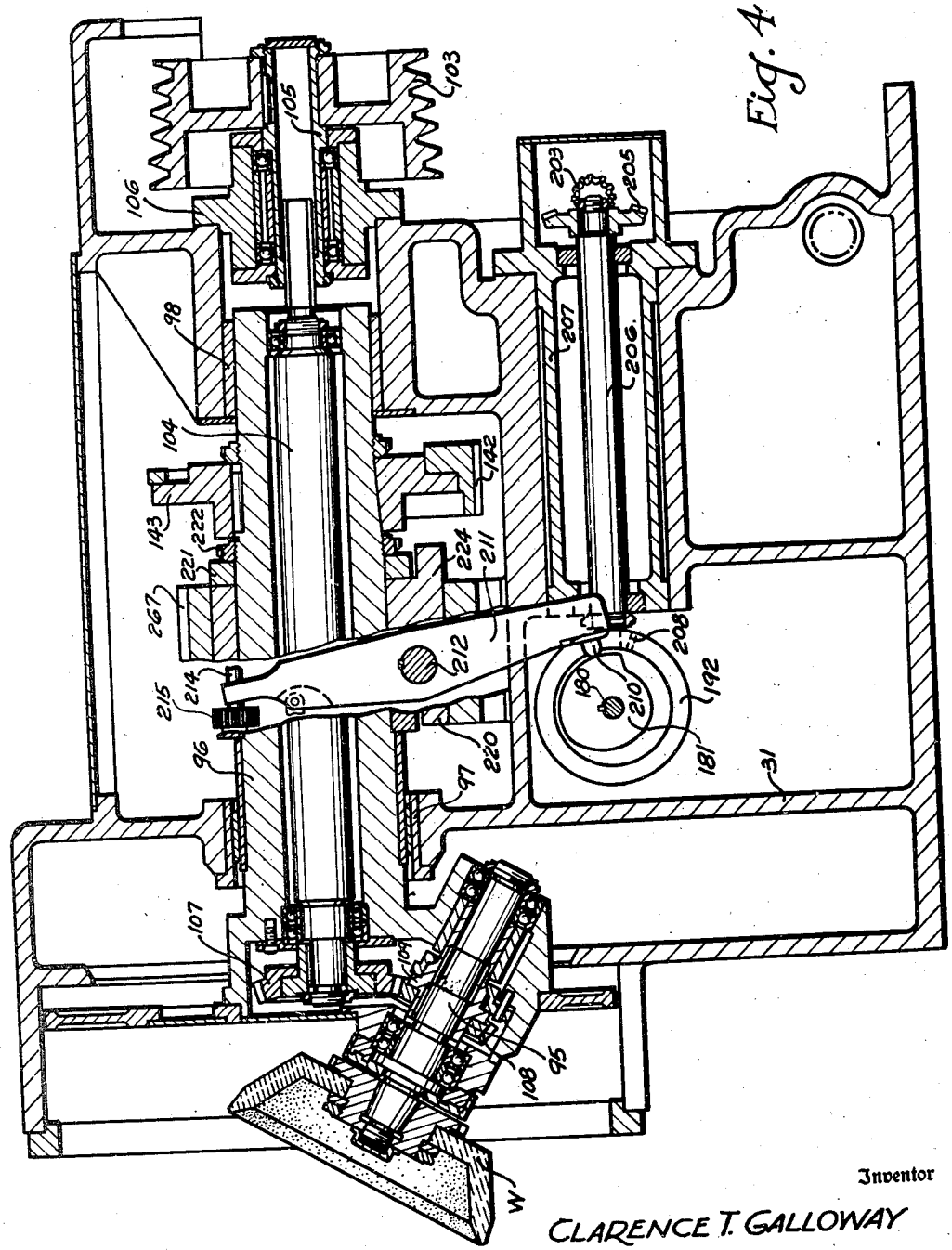
Fig. 4 is a vertical sectional view on an enlarged scale taken longitudinally through the grinding wheel support.

After the various adjustments have been made and the workpiece has been placed on the work spindle, the machine is started by throwing the main line switch to start the work index motor 352 and pump motor 509 (Fig. 27). Then the wheel drive motor 100 is started by pushing in start-button 641, to rotate the wheel W through drive 101—102—103 and gearing 107—108 (Figs. 4 and 25).

The operator now moves valve 512 (Fig. 26) to chuck the work and move sliding base 35 into working position. As already stated, the first operation of the machine is to rough-dress the wheel, and, as soon as the sliding base reaches working position, limit switch 89 (Figs. 26 and 27) is closed starting cycle motor 390. This starts cam shaft 400 (Fig. 17) revolving and cam 403 opens limit switch 416, breaking the circuit to solenoid 524 (Figs. 26 and 27). This causes the sliding base to be moved back to loading position.

As the sliding base moves to loading position, the limit switch 89 opens, stopping cycle motor 390, but when the sliding base reaches loading position, limit switch 90 is closed, starting the cycle motor again. Cam 402 (Figs. 17 and 21) then shifts valve 431 (Figs. 17 and 26) to cause the grinding wheel to be swung from grinding to dressing position under actuation of piston 150 (Fig. 26), rack 156, differential housing 132 and gearing 141—142 (Figs. 4, 15, and 25). The wheel is also advanced by pawl 245 (Figs. 11, 12, and 26) under actuation of piston 240 (Fig. 26), and the dresser bracket 444 is swung into dressing position under actuation of rotary piston 450 (Fig. 26). As piston 150 moves upwardly, limit switch 170 (Figs. 26 and 27) opens, and as dresser bracket 444 swings inwardly, limit switch 453 (Figs. 26 and 27) also opens. Thus cycle motor 390 is stopped again. When the wheel has reached dressing position, however, limit switch 730 (Fig. 27) is closed, and when bracket 444 reaches operative position, limit switch 453 is closed. So, cycle motor 390 starts again.

Cam 401 (Figs. 17 and 22) now shifts valve 430 (Figs. 17 and 26) causing the dresser arms 440, 441, and 443 (Fig. 2) to swing the dressing tools across the sides and tip of the rotating grinding wheel. During swing of arm 440, limit switch 462 (Figs. 26 and 27) is opened, stopping cycle motor 390, but when the swing is completed, this limit switch is closed again, and motor 390 is restarted. Cam 401 (Figs. 17 and 22) is rotated further, therefore, and spring 492 (Figs. 17 and 26) reverses valve 430, causing the dresser arms 440, 441, and 443 to return. During the return stroke of end dresser arm 443, the end dresser bracket 446 is swung about axis 478 (Fig. 26) and the tip dresser does not engage the wheel. The side-dressers however redress the sides of the wheel at a rate controlled by throttle valve 500 (Fig. 26). During the return swing of the dressers limit switch 462 is opened, stopping cycle motor 390, but when the return swing is completed, this limit switch is again closed, and the cycle motor is restarted.

Cam 402 (Fig. 17) will then be rotated further to allow spring 482 (Figs. 17 and 26) to reverse valve 431. Dresser bracket 444 will then be swung out to inoperative position under actuation of rotary piston 450; the wheel will be swung down to operative position under actuation of piston 150; and the wheel-advance mechanism will be reset by piston 240. As the wheel swings down, limit switch 730 opens, and as bracket 444 swings out, limit switch 453 opens. Cycle motor 390 is therefore stopped again.

When the wheel is back in its working path, piston 150 closes limit switch 170 and when bracket 444 reaches inoperative position, limit switch 453 is again closed. Cycle motor 390 is therefore restarted. Cam 403 (Figs. 17 and 20) will, therefore, be rotated far enough to cause limit switch 416 to energize solenoid 524 (Figs. 26 and 27). Sliding base 35 will accordingly be moved back to operation position.

As the sliding base moves inwardly, limit switch 90 opens, stopping cycle motor 390, but when the sliding base has reached operative position, limit switch 89 is closed, starting cycle motor 390 again. Cam 403 (Figs. 17 and 20) will then be rotated further to close limit switch 426, starting feed motor 110 (Figs. 25 and 27), causing the rotating grinding wheel to be oscillated through gearing 113, 114, 116, 117, 120, 122, crank 124, and gearing 134, 136, 137, 135, 141, and 142, causing feed cam shaft 180 to be rotated through gearing 195, 196, 201, 203, 205, 208, and 192 (Figs. 4, 13, 14, 15, and 25), and causing cams 320, 328, and 347 to be rotated under actuation of gearing 340, 341, 343, and 345. The cycle motor 390 continues to run only until the cam 403 (Figs. 17 and 20) has opened limit switch 423. Then it is stopped.

As cam 320 revolves, it trips limit switch 333, causing solenoid 770 to be energized and the work to be indexed. Then whichever of the feed cams 181 to 187 inclusive is in operative position feeds the rotating and oscillating grinding wheel into the work to grind in a tooth space of the work. Then the wheel is withdrawn from the work again, and again limit switch 333 is tripped to index the work.

So the grinding cycle proceeds with the wheel being fed into the work, withdrawn again, and the work indexed until a grind has been made in all of the tooth spaces of the work. Then the automatic stop mechanism 350 (Figs. 1 and 2) will have been advanced far enough by the cam 347 (Figs. 13 and 14) on its revolutions to trip shifting limit switch 754 (Fig. 27) to energize solenoid 565 (Figs. 26 and 27), causing pawl 297 (Figs. 7 and 8) to advance feed cam shaft 180 a step to move a new feed cam into operative position.

As the feed cam shaft is shifted, button 370 (Fig. 9) opens whichever of the limit switches 362 to 368 inclusive is next in line and allows the preceding limit switch to close. The corresponding selector switch of group 355 to 360 inclusive then controls the next operation. If the selector switch is in "grind" position the feed motor 110 will continue to run and the rotating and oscillating wheel will be fed back into the work. If the selector switch is in "rough-dress" or "finish-dress" position, the feed motor will be stopped, the cycle motor 390 will be started and the wheel will be dressed. If the selector switch is in "rough-dress" position, the dressing cycle takes place exactly as above described, viz., the sliding base is withdrawn, the wheel advanced, swung up to dressing position, the dressing mechanism is swung into dressing position and actuated to make a forward and return dress of the wheel, the dressing mechanism is swung out of position, the wheel is returned to working position, the wheel advance mechanism is reset, the sliding base is returned to operative position, the feed motor is restarted, and the cycle motor finally stopped.

If the selector switch is in "finish-dress" position, the only difference in the operation is that the solenoid 505 (Figs. 26 and 27) is energized so that the return swing of the side dressers will be at a finish-dressing rate under control of throttle valve 501.

After the dressing cycle is completed, the machine resumes its grinding cycle to regrind the tooth spaces under control of the new feed cam. After each tooth space has been reground, the wheel is withdrawn and the work indexed. When all of the tooth spaces have been reground, the automatic stop trips, and the feed cam shaft 180 is shifted a step axially. In this movement of shaft 180, button 370 (Fig. 9) opens the next of the limit switches 362 to 368 inclusive and allows the limit switch, which it has previously held open, to close. Then either a new grinding cycle will start or the sliding base will be withdrawn and the wheel dressed before a new grinding cycle is started, depending on the setting of whichever of the selector switches 355 to 360 controls that particular interval between grinding cycles.

Each time that a grinding cycle is completed, the feed cam shaft 180 is moved a step axially and button 370 opens a new limit switch of the series 362 to 368 inclusive and allows the preceding limit switch of this group to close. The selector switch of the series 355 to 360 inclusive, which then becomes operative, then controls what happens next as described. The number of grinds on the work, that is, the number of grinding cycles performed depends on the setting of stop-bar 581 (Fig. 7).

When the last grind, the finish-grind, has been made in all of the tooth spaces of the work and the automatic stop 350 is tripped, the wheel motor 100 and feed motor 110 are both stopped, and the solenoids 312 and 575 (Figs. 26 and 27) are both energized, causing lock-dog 305 to be disengaged and feed cam shaft 180 to be reset to initial position. The operator can now rotate valve 512 to move the sliding base 35 to loading position and dechuck the work.

While the invention has been described in connection with a particular embodiment thereof and in connection with a particular use for this embodiment, it will be understood that the invention is capable of various further modifications and uses, and that this application is intended to cover any adaptations, uses, or embodiments of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, a frame, a tool mounted on the frame, means for actuating the tool to move it in a longitudinally curved path across the face of the work, a rotary work spindle, a head in which the work spindle is journaled, a table on which the head is mounted for adjustment in a direction at right angles to the axis of the work spindle, and a slide on which the table is mounted for angular adjustment about an axis which has a fixed position longitudinally of the axis of the work spindle and which extends at right angles to the axis of the work spindle and which intersects the axis of the work spindle in a point intermediate the ends of the work spindle, said slide being mounted on the frame for lateral adjustment in a direction at right angles to the direction of adjustment of the head and at right angles to the axis about which the table is adjustable, the adjustment of the head and slide serving to position the work relative to the tool in accordance with the hand of curvature of the teeth to be produced on the work and the angular adjustment of the table serving to position the work relative to the tool in accordance with the root angle of the gear to be produced.

2. In a machine for grinding gears, which is of the intermittent indexing type and which comprises a tool support, a grinding wheel journaled therein, means for rotating the grinding wheel, a work support, a work spindle journaled therein, a plurality of cams, each of which is operable on rotation, when in operative position, to impart a feed and a withdrawal movement between the wheel and work per revolution of the cam, means for actuating the indexing mechanism of the machine on each withdrawl movement, means for successively moving the cams into operative position, means for rotating the cams when in operative position, and adjustable means for predetermining the number of cams which are to be operable during the grinding of a particular gear.

3. In a machine for grinding gears, which is of the intermittent indexing type and which comprises a tool support, a grinding wheel journaled therein, means for rotating the grinding wheel, a work support, a work spindle journaled therein, a plurality of cams, each of which is operable, on rotation when in operative position, to impart a feed and a withdrawal movement between the wheel and the work per revolution of the cam, means for actuating the indexing mechanism of the machine during each withdrawal movement, means for shifting one cam out of operative position and moving a new cam into operative position periodically after each time that the wheel has taken a grind in all the tooth spaces of the work, means for rotating the cams when in operative position, and adjustable means for predetermining the number of cams which are to be operable during grinding of a particular gear.

4. In a machine for grinding gears, which is of the intermittent indexing type and which comprises a tool support, a grinding wheel journaled therein, means for rotating the grinding wheel, a work support, a work spindle journaled therein, means for effecting alternate movements of feed and withdrawal between the wheel and the work, means for actuating the indexing mechanism of the machine on each withdrawal movement, means for changing the position of the feed means periodically after each cycle of operation in which the wheel takes a grind in all the tooth spaces of the work, thereby to increase the amount of the feed movement, and means for predetermining the number of cycles of operation on the work.

5. In a machine for grinding gears, a tool support, a grinding wheel journaled therein, means for rotating the wheel, mechanism for dressing the wheel, means for effecting alternate movements of feed and withdrawal between the work and the wheel, said last named means being constructed so that in different positions it will impart different amounts of relative feed between the wheel and the work, means for periodically changing the position of the last named means, and means operable by the last named means in the movement of said means from one position to another to predetermine whether the dressing mechanism is to be actuated or not.

6. In a machine for producing gears, a tool support, a grinding wheel journaled therein, means for rotating the grinding wheel, a plurality of cams, each of which is adapted, on rotation thereof when in operative position, to impart alternate movements of feed and withdrawal between the wheel and the work, each cam being of different shape from each other cam to impart a different amount of relative feed movement from any other cam, means for rotating the cams when in operative position, means for periodically shifting the cams to move one out of operative position and bring another into operative position, dressing mechanism for the wheel, means for actuating the dressing mechanism, and means for selectively predetermining whether during the periods of shift of the cams the dressing mechanism is to be actuated or not.

7. In a machine for grinding gears, a tool support, a grinding wheel journaled therein, means for rotating the grinding wheel, a plurality of cams, each of which is adapted, on rotation thereof when in operative position, to impart alternate movements of feed and withdrawal between the wheel and the work, each cam being of a different shape from any other cam to impart a different amount of relative feed movement from any other cam, means for rotating the cams when in operative position, means for periodically shifting the cams to move one out of operative position and bring another into operative position, mechanism for dressing the grinding wheel, means for actuating the dressing mechanism, and means operative on shifting of the cams for selectively predetermining whether the rotation of the cams is to be stopped and the dressing mechanism is to be actuated or not, before continuing the grinding operation under control of the newly-positioned cam.

8. In a machine for producing gears, which is of the intermittent indexing type and which comprises a tool support, a grinding wheel rotatably mounted in the tool support, a work support, a work spindle journaled therein, means for rotating the grinding wheel, means for effecting alternate feed and withdrawal movements between the work and the wheel, means for actuating the indexing mechanism of the machine on each withdrawal movement, means operative periodically after the work has been indexed through one revolution to shift the feed means to cause the depth of a feed to be increased on the ensuing feed movements, means adjustable to predetermine the number of such shifts during grinding of a given work piece, and means operable on completion of the predetermined number of such shifts to return the feed means to initial position.

9. In a machine for producing gears, which is of the intermittent indexing type and which comprises a tool support, a tool mounted thereon, a work support, a work spindle journaled therein, means for actuating the tool, means comprising a plurality of coaxially mounted cams for imparting alternate feed and withdrawal movements between the tool and work, each of said cams being constructed to impart a different amount of feed movement from any other of the cams and one of the cams only being in operative position at a time, means operable on each withdrawal movement for actuating the indexing mechanism of the machine, means operative periodically after the work has been indexed through a revolution to shift the cams axially in one direction to move one cam into operative position and move another therefrom, means for predetermining the number of shifts of the cams to predetermine the number of grinds on the gear, and means operable on completion of the predetermined number of grinds to return the cams to original axial position.

10. In a machine for grinding gears, a work support, a tool support, a grinding wheel journaled on the tool support, means for rotating the grinding wheel, means for effecting relative feed and withdrawal movements between the wheel and the work, means operative periodically after a predetermined number of feed and withdrawal movements for moving said feed means to increase the depth of the feed movement, and means operable at predetermined intervals to stop the feed and withdrawal movements, dress the wheel, and then restart the feed and withdrawal movements.

11. In a machine for producing gears, a frame, a tool support, a grinding wheel journaled in the tool support, a work support, a work spindle journaled therein, a follower and a rotary control member operatively connected thereto, one of which is mounted on one of said supports and the other on the frame, and one of which is shiftable relative to the other axially of the control member to cause the follower to engage different portions of the control member, said control member comprising a plurality of cams, each of which is adapted to effect alternate feed and withdrawal movements between wheel and work as it is revolved in engagement with the follower and each of which is adapted to effect a different amount of feed movement than the preceding cam, means for rotating the control member, means for periodically shifting the shiftable part, and means operable on predetermined shifting movements to stop rotation of the control member, dress the wheel, and restart rotation of the control member.

12. In a machine for grinding gears, a tool support, a grinding wheel journaled therein, a work support, a work spindle journaled therein, a shaft, a plurality of feed cams secured to said shaft to rotate therewith, each of which is formed to impart a feed and a withdrawal movement between the wheel and work in a revolution of the shaft, each successive cam being so constructed, also, as to produce a different amount of feed movement than the preceding cam, means for rotating the shaft, means for effecting a periodic step-by-step shift of the shaft axially in one direction to bring successive cams successively into operative position, and means for applying fluid-pressure directly to one end of the shaft to return the shaft to initial position on completion of the grinding operations on a gear.

13. In a machine for producing gears, a tool support, a grinding wheel journaled therein, dressing mechanism, means for actuating said dressing mechanism, a work support, a work spindle journaled therein, a shaft, a plurality of feed cams secured to said shaft to rotate therewith, each of which is formed to effect a feed and a withdrawal movement between the tool and work in a revolution of the shaft, each successive cam being constructed to produce a different amount of feed than the preceding cam, means for rotating the shaft, means for effecting a periodic step-by-step shift of the shaft axially in one direction to bring the successive cams successively into operative position, a plurality of adjustable members for predetermining whether after each shift of the shaft, rotation of the shaft is to continue to continue the feed movements, or whether rotation of the shaft is to be stopped, the wheel to be dressed, and then the shaft restarted, and means operatively connected to the shaft to trip said adjustable members successively on the shifting of the shaft.

14. In a machine for producing gears, a tool support, a grinding wheel journaled therein, a work support, a work spindle journaled therein, a shaft, a plurality of feed cams secured to said shaft to rotate therewith, each of which is formed to impart, when in operative position, a feed and a withdrawal movement between the tool and the work in a revolution of the shaft, each successive cam being so constructed as to produce a different amount of feed than the preceding cam, means for rotating the shaft, means for effecting a periodic step-by-step shift of the shaft axially in one direction to bring successive cams successively into operative position, a plurality of adjustable control members for predetermining whether after each periodic shift of the shaft, rotation of the shaft is to continue to continue the feed movements or whether rotation of the shaft is to be stopped, means operable on stoppage of the shaft for withdrawing the work support from operative position, for dressing the wheel, for returning the work support to operative position again, and for restarting the means for rotating the shaft, and means operatively connected to the shaft to trip said control members successively on shifting of the shaft.

15. In a machine for grinding gears, which is of the intermittent indexing type and which comprises a tool support, a grinding wheel journaled therein, a work support, a work spindle journaled therein, means for rotating the wheel, means for imparting alternate feed and withdrawal movements between the work and wheel, means for actuating the indexing mechanism of the machine on each withdrawal movement, means operative periodically each time that a number of feed movements has been effected equal to the number of tooth spaces in the work to shift the feed means so as to cause the wheel to grind deeper in the work on the ensuing feed movement, means for withdrawing the work support from operative position and returning it again, means for dressing the wheel, and means operative on predetermined shifts of the feed means to actuate the work support withdrawal mechanism, the wheel dressing mechanism, and then to return the work support to operative position, and restart the feed means.

16. In a machine for producing gears, a tool support, a quill oscillatably mounted therein, a grinding wheel journaled in the quill, a work support, a work spindle journaled therein, means for rotating the grinding wheel, means for oscillating the quill to pass the wheel back and forth along the tooth spaces of the work, means for moving the quill independently of the oscillating means to swing the wheel from working position to dressing position, means for dressing the wheel, means for effecting alternate feed and withdrawal movements between the wheel and work when the wheel is in working position to grind the tooth spaces of the work, means operative after grinding all of the tooth spaces of the work to shift the feed means to cause the wheel to grind deeper into the work on the ensuing feed movement, and means operative on predetermined shifts of the wheel to stop the feed means, swing the wheel from working to dressing position, actuate the dressing mechanism to dress the wheel, swing the wheel back to working position, and restart the feed means.

17. In a machine for grinding gears, a tool support, a grinding wheel journaled therein, a work support, a work spindle journaled therein, means for rotating the wheel, mechanism for dressing the wheel, feed means for effecting alternate movements of feed and withdrawal between the wheel and the work, means for periodically changing the position of the feed means step-by-step, said feed means being so constructed that in different positions it will impart different amounts of relative feed movement between the wheel and the work, a selector member for each position to which the feed means may be moved from its initial position, each of said selector members being adjustable into one of two different positions, each of said selector members when in one position of its adjustment being operative to stop the feed means and cause the dressing mechanism to be actuated before the feed and withdrawal movements resume in the new position of the feed means, and each of said selector members when in the other position of its adjustment being operative to cause the feed means to continue in operation, after being shifted, without interruption.

18. In a machine for grinding gears, a tool support, a grinding wheel journaled therein, means for rotating the wheel, a work support, a work spindle journaled therein, mechanism for dressing the wheel at a relatively fast rate for rough-grinding and at a relatively slow rate for finish-grinding, feed means for effecting alternate movements of feed and withdrawal between the wheel and the work, means for periodically shifting the feed means step-by-step, said feed means being so constructed that in different positions it will impart different amounts of relative feed movement between the wheel and the work whereby the work may be ground progressively to the desired depth, a selector member for each position to which the feed means may be moved from its initial position, each of said selector members being adjustable into one of three different positions, each of said selector members when in one or other of two of its positions of adjustment being adapted to actuate the dressing mechanism to dress the wheel, the dressing operation being effected at fast speed for one of said positions of adjustment of the selector member and at slow speed for the other of said positions, and each of said selector members being adapted when in the third position of its adjustment to cause the feed means to continue in operation, after being shifted, without interruption, and means whereby the shifting of the feed means from one position to the other renders the selector at the latter position operative.

19. In a machine for grinding gears, a tool support, a grinding wheel journaled therein, means for rotating the wheel, a work support, a work spindle journaled therein, means for moving one of said supports toward and from operative position, means for dressing the wheel when in inoperative position, a shaft, a plurality of feed cams axially disposed along said shaft and secured thereto to rotate therewith, each of said cams being formed to impart a feed and a withdrawal movement between the wheel and work per revolution of the shaft when the wheel and work and cam are in operative positions, each successive cam being so constructed, also, as to produce a greater amount of feed movement than the preceding cam, means for effecting a periodic step-by-step shift of the shaft axially in one direction to bring the cams successively into operative position to permit grinding of the work step-by-step to the desired depth under control of the successive cams, a plurality of adjustable seelctor members, one less than the number of cams, for predetermining on each step-by-step movement of the shaft whether or not the work will be moved relatively away from the wheel to inoperative position and the wheel dressed before continuing with the grinding operation under control of the newly-positioned cam, and means operable by shift of the shaft for rendering said selector members operative successively on each shifting movement of the shaft, and means for returning the shaft to initial position when the work has been ground to the desired depth.

20. In a machine for grinding gears, a tool support, a grinding wheel journaled therein, a work support, a work spindle journaled therein, a shaft, a pluraltty of feed cams secured to said shaft to rotate therewith, each of which is formed to impart a feed and a withdrawal movement between the wheel and work in a revolution of the shaft, each successive cam being so constructed, also, as to produce a different amount of feed movement than the preceding cam, means for rotating the shaft, a sleeve in which the shaft is journaled and which is secured to the shaft to move axially therewith, means engaging the sleeve to lock the shaft in a given axial position, means for periodically disengaging said locking means and advancing the shaft axially to bring the successive cams successively into operative position, and means operable after a predetermined number of advancing movements of the shaft to disengage the locking means and return the shaft to initial position.

CLARENCE T. GALLOWAY.

REFERENCES CITED

The following references are of record in the file of this patent:

UNITED STATES PATENTS

| Number | Name | Date |
|---|---|---|
| 1,901,236 | Guild | Mar. 14, 1933 |
| 1,982,050 | Gleason et al. | Nov. 27, 1934 |
| 2,196,087 | Staples et al. | Apr. 2, 1940 |